United States Patent [19]

Eshleman et al.

[11] Patent Number: 5,353,719

[45] Date of Patent: Oct. 11, 1994

[54] APPARATUS AND METHOD FOR CONTROLLED PROCESSING OF MATERIALS

[76] Inventors: Roger D. Eshleman, 506 Clayton Ave., Waynesboro, Pa. 17268; Paul H. Stevers, 147-A Binscarth Avenue, Kitchener, Ontario, Canada, N2M 3E4

[21] Appl. No.: 987,928

[22] Filed: Dec. 9, 1992

[51] Int. Cl.⁵ .................. F23G 5/00; B09B 3/00
[52] U.S. Cl. .................. 110/188; 110/250; 110/235; 110/234; 110/229; 219/394; 373/109; 126/273 R
[58] Field of Search .............. 110/250, 235, 234, 233, 110/229, 188–190, 214, 297; 219/284, 394; 392/386; 373/110, 109; 126/273 R

[56] References Cited

U.S. PATENT DOCUMENTS

| | | | |
|---|---|---|---|
| 437,009 | 9/1890 | Auchu | 110/234 |
| 2,855,494 | 10/1958 | Kuebler | 110/250 |
| 3,716,001 | 2/1973 | Potasek et al. | 110/190 |
| 3,742,874 | 7/1973 | Eff | 110/250 |
| 4,182,246 | 1/1980 | Lombona et al. | 110/188 |
| 4,206,186 | 6/1980 | Holter et al. | 423/230 |
| 4,334,484 | 6/1982 | Payne et al. | 110/210 |
| 4,356,778 | 11/1982 | McKee | 110/244 |
| 4,438,705 | 3/1984 | Basic | 110/235 |
| 4,495,873 | 1/1985 | Blankenship | 110/250 |
| 4,513,671 | 4/1985 | Eshleman | 110/101 CF |
| 4,531,464 | 7/1985 | Eshleman | 110/259 |
| 4,598,649 | 7/1986 | Eshleman | 110/211 |
| 4,599,141 | 7/1986 | Shultz | 201/2.5 |
| 4,635,899 | 1/1987 | Eshleman | 251/298 |
| 4,759,300 | 7/1988 | Hansen et al. | 110/229 |
| 4,779,795 | 10/1988 | Winmill | 110/234 X |
| 4,802,424 | 2/1989 | McGinnis, III et al. | 110/250 |
| 4,924,785 | 5/1990 | Schultz et al. | 110/346 |
| 4,934,283 | 6/1990 | Kydd | 110/246 |
| 4,949,652 | 8/1990 | Hadley | 110/215 |
| 5,065,680 | 11/1991 | Cheetham | 110/342 |
| 5,236,470 | 8/1993 | Levin | 48/210 |

*Primary Examiner*—Henry A. Bennet
*Assistant Examiner*—William C. Doerrler
*Attorney, Agent, or Firm*—Michael R. Swartz; John R. Flanagan

[57] ABSTRACT

An apparatus for controlled processing of materials includes a coolant jacketed vessel defining a first pyrolysis chamber and a second oxidation chamber, first heating elements mounted in the vessel to pyrolyze materials in the first chamber, second heating elements mounted in the vessel to oxidize materials in the second chamber, an induction fan, airflow inlet valves and an air intake proportioning valve connected to the vessel for producing separate variable flows of primary and secondary air into and through the first and second chambers, first sensors mounted on the vessel for sensing the temperatures in the first and second chambers and in the coolant, a second sensor mounted on the vessel for sensing the proportion of a predetermined gas in the discharge gases, and a control system responsive to the temperatures sensed in the first and second chambers and the coolant and to the proportion of the predetermined gas sensed in the discharge gases for controlling the induction fan and air intake proportioning valve so as to proportion the respective amounts of primary and secondary air flows through the first and second chambers in order to achieve effective pyrolyzing and oxidizing of the materials therein.

31 Claims, 20 Drawing Sheets

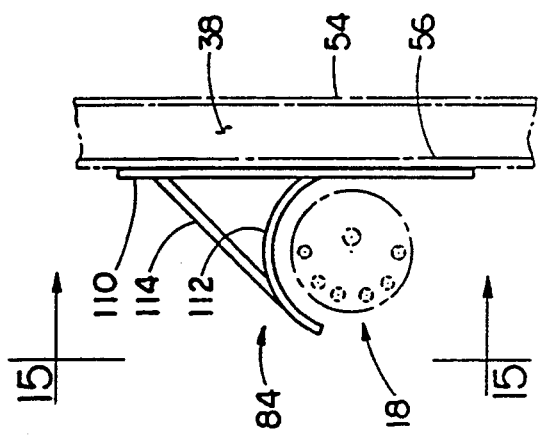
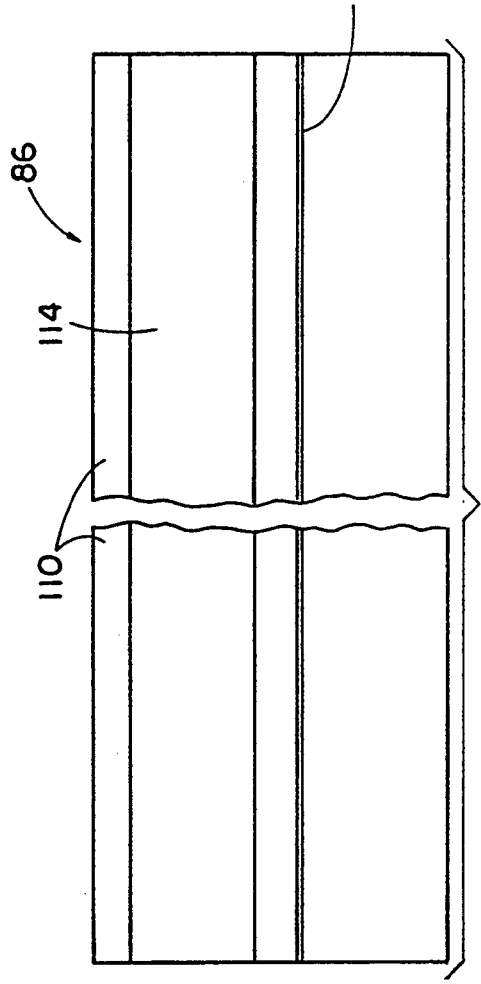
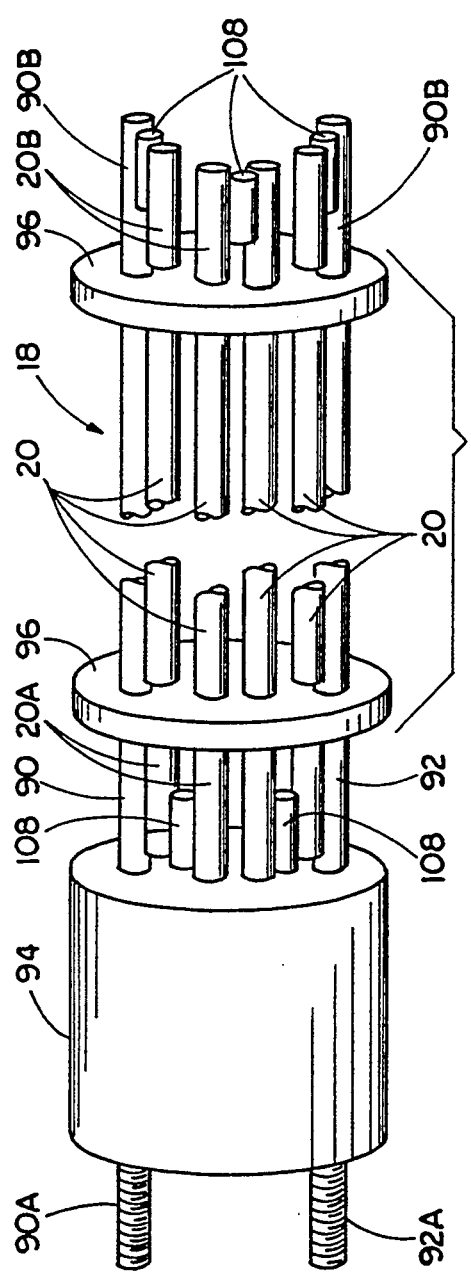

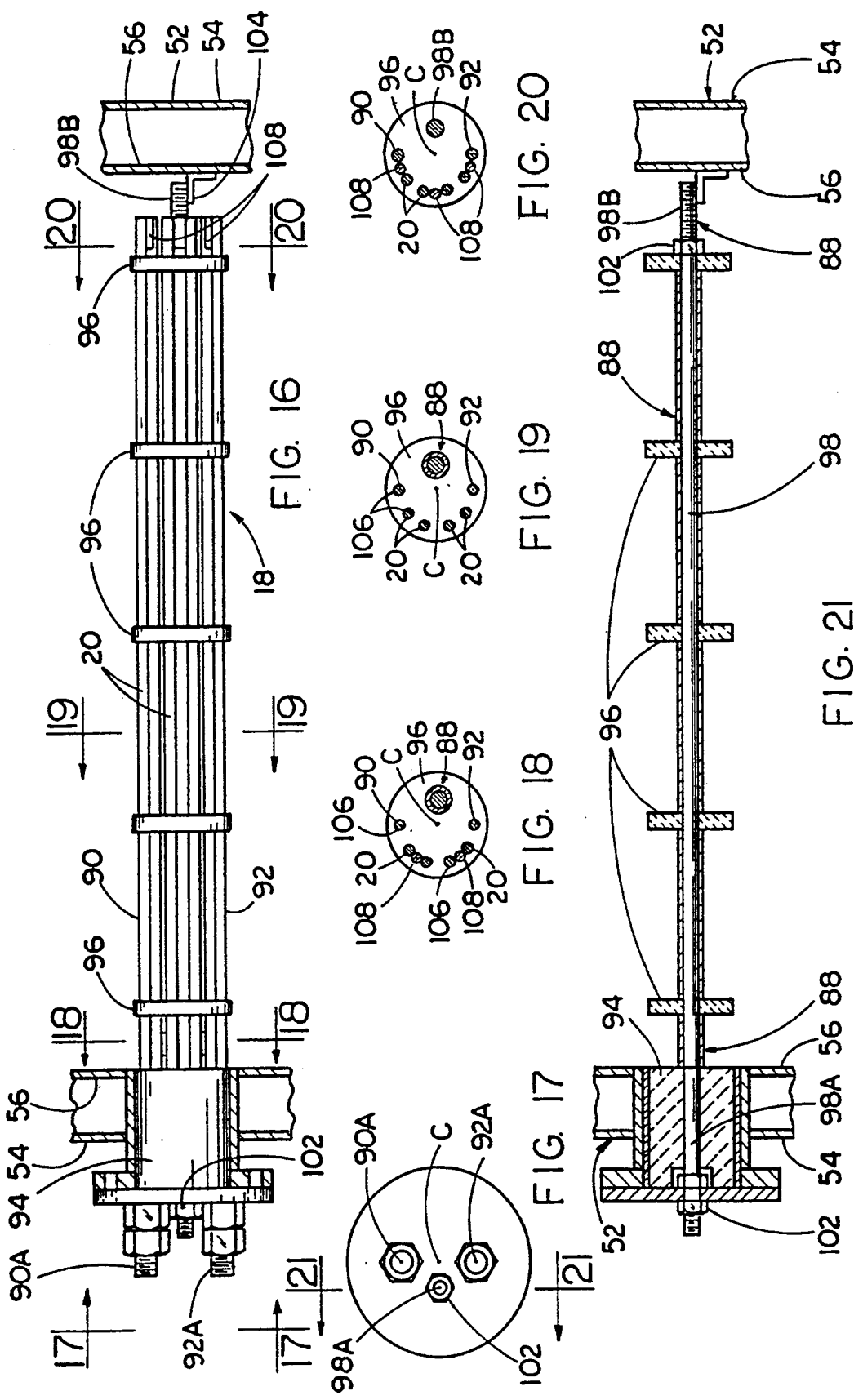

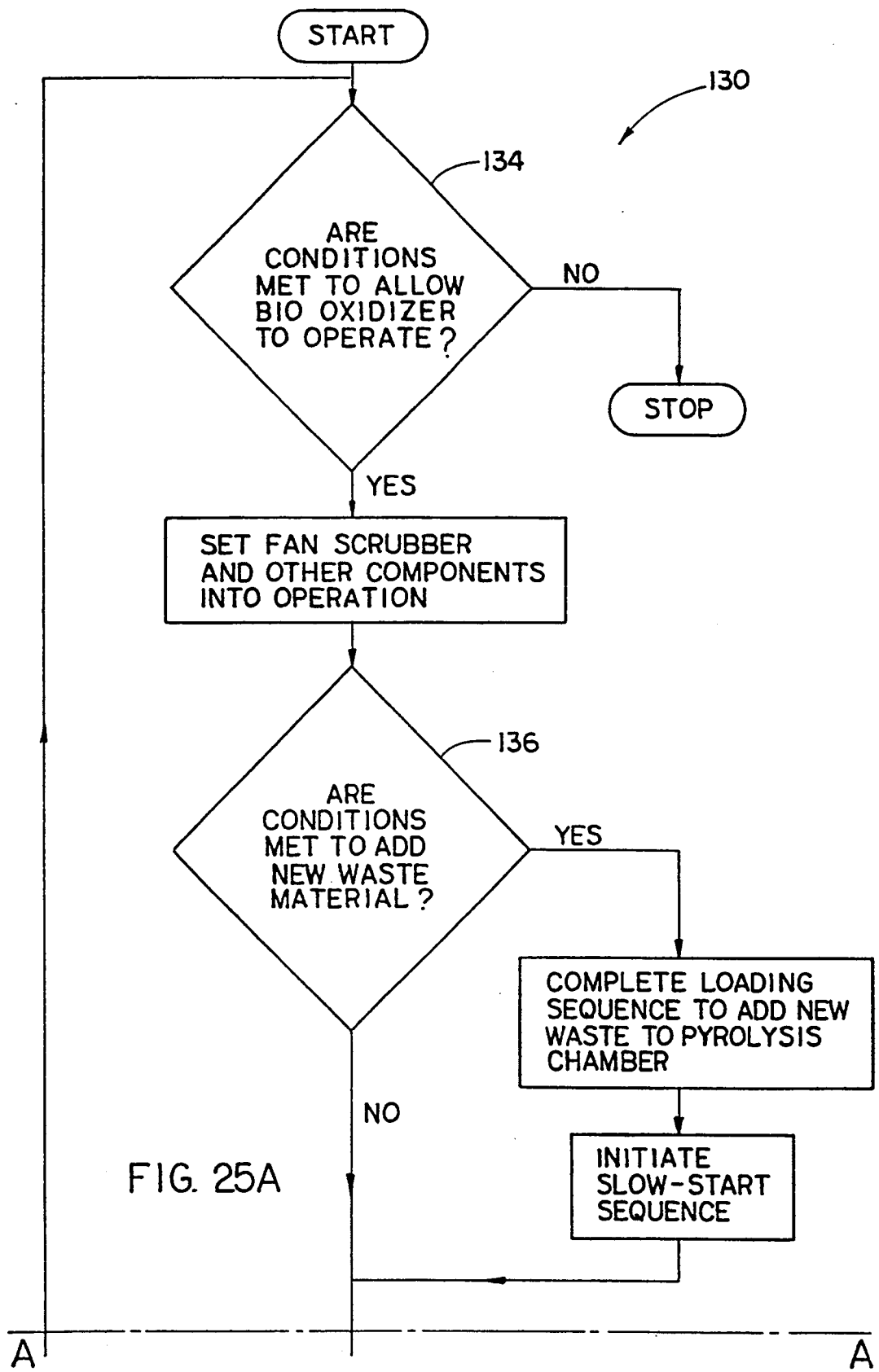

APPARATUS AND METHOD FOR CONTROLLED PROCESSING OF MATERIALS

CROSS REFERENCE TO RELATED APPLICATIONS

Reference is hereby made to the following copending U.S. applications dealing with subject matter related to the present invention:

1. "Multiple Unit Material Processing Apparatus" by Roger D. Eshleman, assigned U.S. Ser. No.07/987,929 and filed Dec. 9, 1992.

2. "Heat Generator Assembly In A Material Processing Apparatus" by Roger D. Eshleman, assigned U.S. Ser. No. 07/987,936 and filed Dec. 9, 1992.

3. "Casing And Heater Configuration In A Material Processing Apparatus" by Roger D. Eshleman, assigned U.S. Ser. No. 07/987,946 and filed Dec. 9, 1992.

BACKGROUND OF THE INVENTION

1. Field of the Invention

The present invention generally relates to material processing and, more particularly, is concerned with an apparatus and method for controlled processing of materials, such as the disposal of medical and other waste matter, particularly on-site where the waste matter is produced.

2. Description of the Prior Art

The problem of disposal of waste matter involves a material processing challenge that is becoming increasingly acute. The primary material processing methods of waste disposal have been burning in incinerators and burial in landfills. These two material processing methods have severe disadvantages. Burning of waste liberates particulate matter and fumes which contribute to pollution of the air. Burial of wastes contributes to the contamination of ground water. A third material processing method is recycling of waste. Although increasing amounts of waste are being recycled, which alleviates the problems of the two primary material processing methods, presently available recycling methods do not provide a complete solution to the waste disposal problem.

The problem of disposal of biomedical waste materials is even more acute. The term "biomedical waste materials" is used herein in a generic sense to encompass all waste generated by medical hospitals, laboratories and clinics which may contain hazardous, toxic or infectious matter whose disposal is governed by more stringent regulations than those covering other waste. It was reported in *The Wall Street Journal* in 1989 that about 13,000 tons a day of biomedical waste, as much as 20% of it infectious, is generated by around 6,800 U.S. hospitals.

Hospitals and other generators of biomedical waste materials have employed three main material processing methods of waste handling and disposal: (1) on-site incineration with only the residue transferred to landfills; (2) on-site steam autoclaving followed by later transfer of the waste to landfills; and (3) transfer of the waste by licensed hazardous waste haulers to off-site incinerators and landfills. Of these three main material processing methods, theoretically at least, on-site disposal is the preferred one.

However, many hospital incinerators, being predominantly located in urban areas, emit pollutants at a relatively high rate which adversely affect large populations of people. In the emissions of hospital incinerators, the Environmental Protection Agency (EPA) has identified harmful substances, including metals such as arsenic, cadmium and lead; dioxins and furans; organic compounds like ethylene, acid gases and carbon monoxide; and soot, viruses, and pathogens. Emissions of these incinerators may pose a public health threat as large as that from landfills.

Nonetheless, on-site disposal of biomedical waste materials still remains the most promising solution. One recent on-site waste disposal unit which addresses this problem is disclosed in U.S. Pat. No. 4,934,283 to Kydd. This unit employs a lower pyrolyzing chamber and an upper oxidizing chamber separated by a movable plate. The waste material is deposited in the lower chamber where it is pyrolyzed in the absence of air and gives off a combustible vapor that, in turn, is oxidized in the upper chamber. While this unit represents a step in the right direction, it does not appear to approach an optimum solution to the problem of biomedical waste material disposal.

SUMMARY OF THE INVENTION

The present invention provides a material processing apparatus and method designed to satisfy the aforementioned needs. While the material processing apparatus and method of the present invention can be used in different applications, it is primarily useful in waste disposal and particularly effective in disposing biomedical waste material on-site where the waste material is produced. A greater than 95% reduction in mass and volume is achieved as is the complete destruction of all viruses and bacteria. The residue is a sterile, inert inorganic powder, which is non-hazardous, non-leachable and capable of disposal as ordinary trash.

The preferred embodiment of the present invention includes various unique features for facilitating the processing material and particularly the disposing of material. Although some of these features comprise inventions claimed in other copending applications cross-referenced above, all are illustrated and described herein for facilitating a complete and thorough understanding of the features comprising the present invention.

Accordingly, the present invention is directed to a material processing apparatus and method comprising the operative steps of: (a) providing a first chamber capable of receiving feed materials to be processed; (b) electrically producing heating in the first chamber to cause pyrolyzing of the feed materials into fluid materials; (c) providing a second chamber communicating with the first chamber and capable of receiving the fluid materials from the first chamber and communicating the fluid materials to a discharge location; (d) electrically producing heating in the second chamber to cause oxidizing of the fluid materials into discharge gases reaching the discharge location; (e) producing separate variable flows of primary and secondary air respectively into and through the first and second chambers; (f) sensing the temperatures in the first and second chambers; (g) sensing the concentration of a predetermined gas in the discharge gases; and (h) in response to the temperatures sensed in the first and second chambers and to the concentration of the predetermined gas sensed in the discharge gases, controlling the air flow producing means so as to proportion the respective amounts of primary and secondary air flows produced through the first and second chambers and controlling the heating in the first and second chamber in order to achieve effective pyrolyzing and oxidizing of the feed materials therein.

More particularly, the first pyrolyzing chamber and the second oxidizing chamber are provided as airtight coolant-jacketed chambers. The second oxidizing chamber includes primary and secondary oxidizing chamber sections for oxidizing the material in two successive stages.

Further, the controlling of the air flow includes comparing the oxygen concentration sensed to a preset target level, and changing the proportion of primary air flow to secondary air flow if the sensed oxygen concentration is either higher or lower than the preset target level. The changing of the proportion of primary and secondary air flows occurs at a higher rate if the sensed oxygen concentration is lower than the preset target level than if the sensed oxygen concentration is higher than the preset target level. Preferably, the target oxygen concentration (for both the valve position and fan speed control algorithms) is varied as the temperature in the oxidation chamber varies between two preset levels.

Also, the controlling of the air flow includes comparing the oxygen concentration sensed to a preset target level, and changing the speed of an induction fan to change the amount of primary and secondary air flows if the sensed oxygen concentration is higher or lower than the preset target level. The changing of the speed of the induction fan occurs at a higher rate if the sensed oxygen concentration is lower than the preset target level than if the sensed oxygen concentration is higher than the preset target level.

Still further, the controlling of the heating includes comparing the temperatures sensed to preset target levels, and increasing the heating if the sensed temperatures are lower than the preset target levels.

These and other features and advantages and attainments of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

In the course of the following detailed description, reference will be made to the attached drawings in which:

FIG. 13 is an enlarged foreshortened perspective view of one of the heating units of the apparatus shown in FIGS. 8 and 9.

FIG. 14 is an enlarged end elevational view of a deflector device associated with each of the heating units of the first housing unit.

FIG. 15 is a foreshortened front elevational view of the deflector device as seen along line 15—15 of FIG. 14.

FIG. 16 is an enlarged longitudinal elevational view of one of the heating units of the apparatus shown in FIG. 9 of the first housing unit.

FIG. 17 is an end elevational view of the heating unit as seen along line 17—17 of FIG. 16.

FIG. 18 is a cross-sectional view of the heating unit taken along line 18—18 of FIG. 16.

FIG. 19 is another cross-sectional view of the heating unit taken along line 19—19 of FIG. 16.

FIG. 20 is still another cross-sectional view of the heating unit taken along line 20—20 of FIG. 16.

FIG. 21 is a longitudinal sectional view of the heating unit taken along line 21—21 of FIG. 17.

FIGS. 25A and 25B, taken together, show a flow chart of the overall operation of the apparatus of FIGS. 1 and 24.

DETAILED DESCRIPTION OF THE INVENTION

Figure 1:
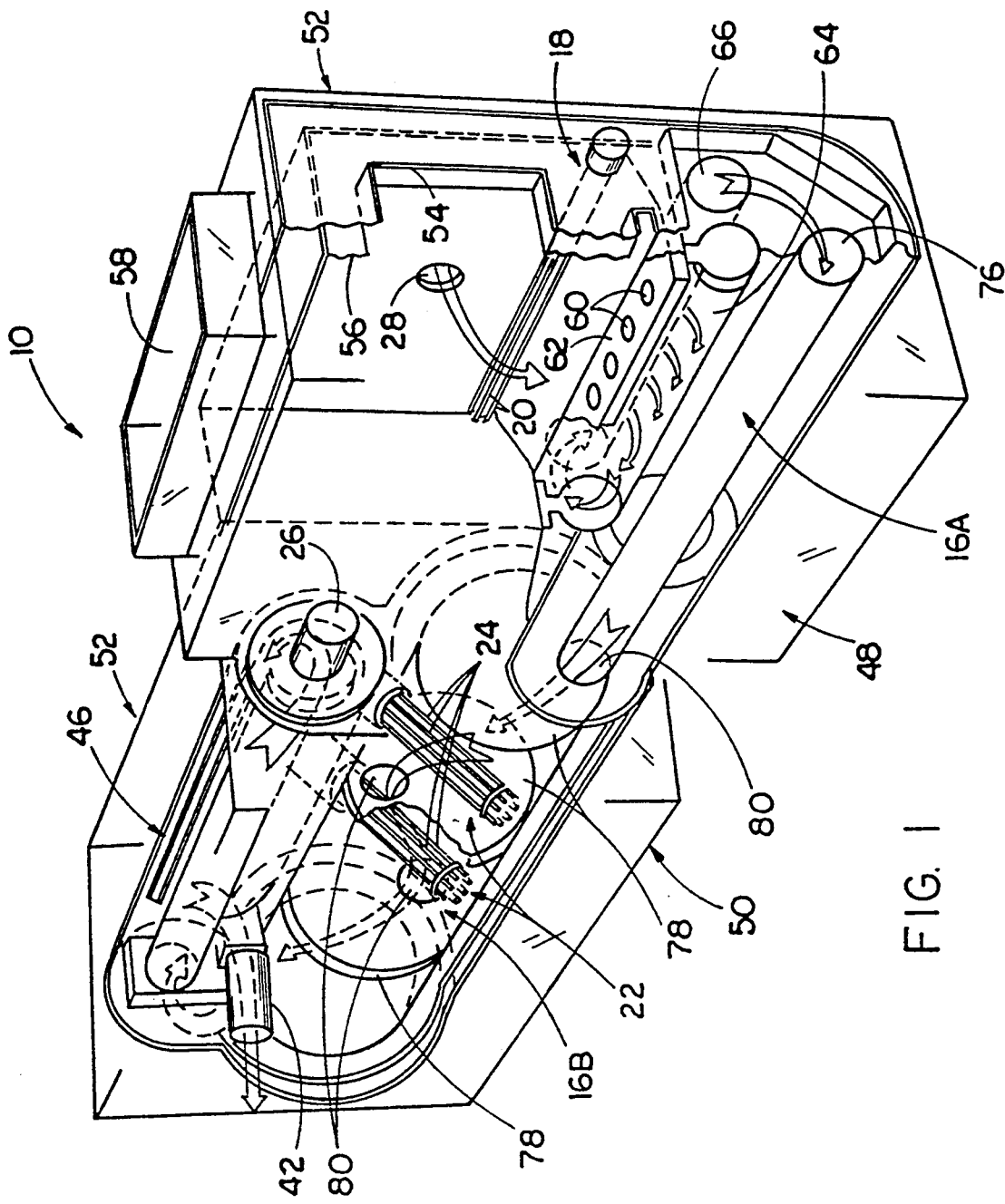
FIG. 1 is a schematical perspective view of an apparatus for controlled processing of materials including features in accordance with the present invention.
Figure 2:
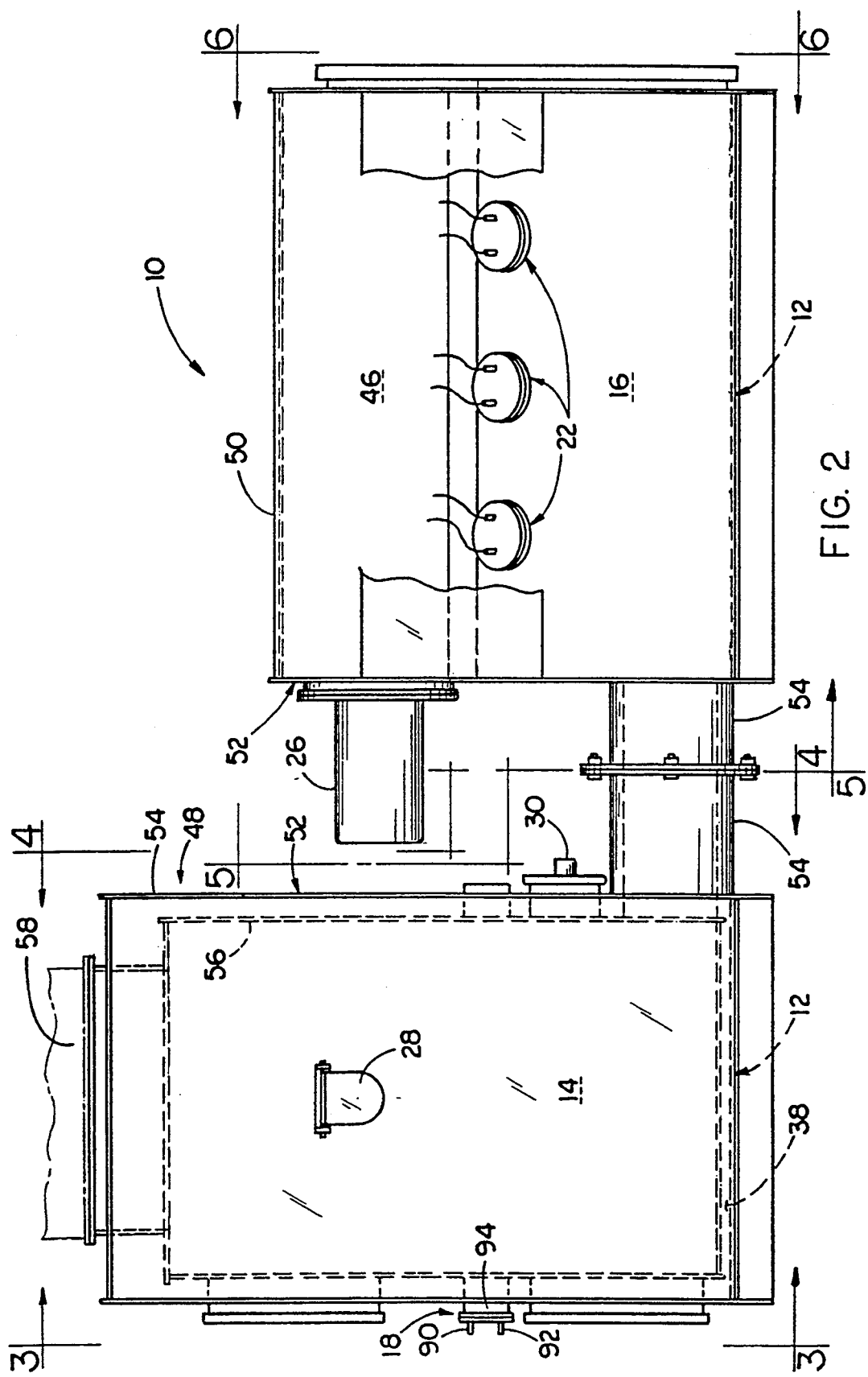
FIG. 2 is an enlarged side elevational view of the apparatus of FIG. 1, showing an opposite side from that shown in FIG. 1.
Figure 3:
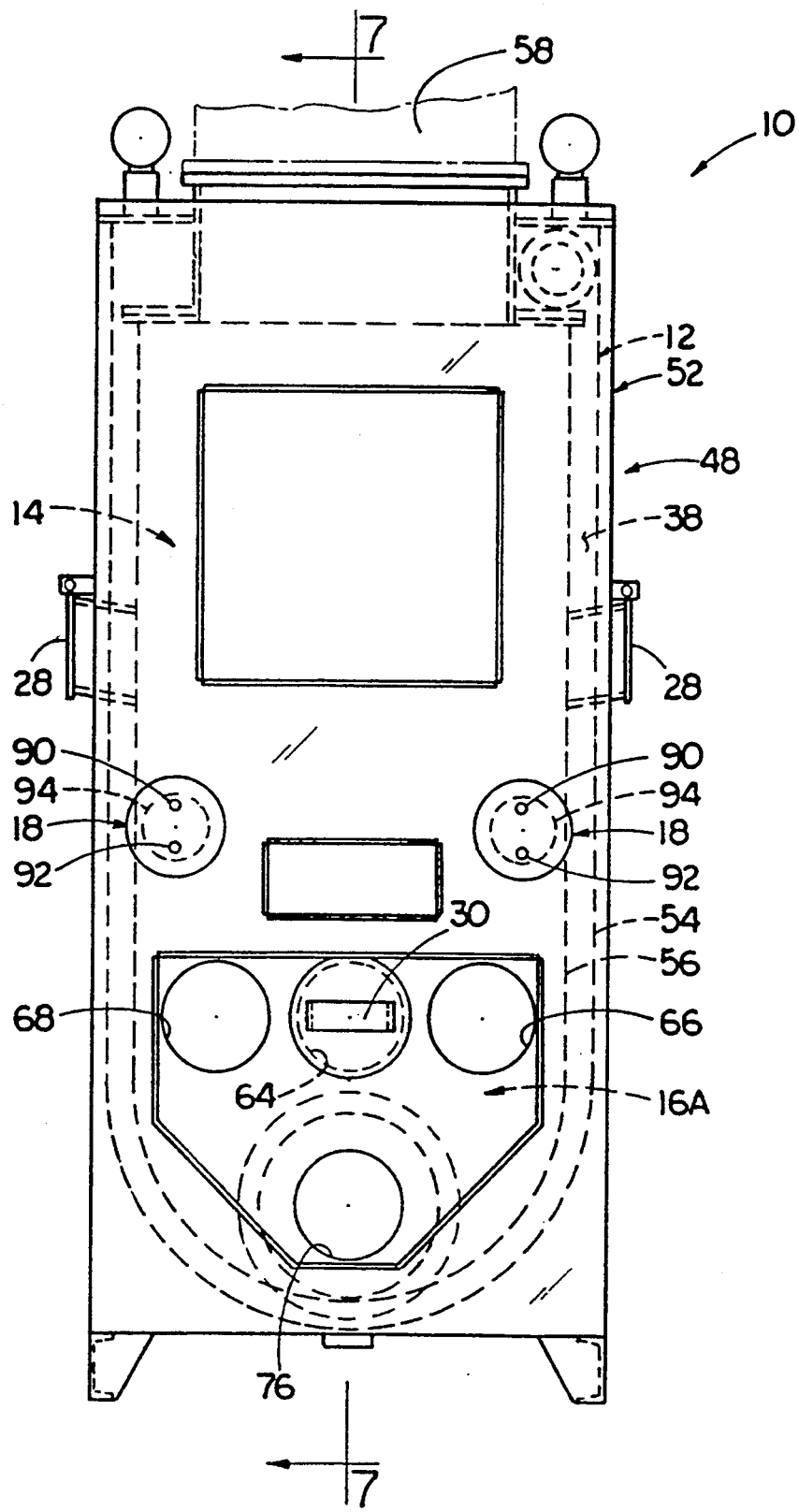
FIG. 3 is an enlarged end elevational view of a first housing unit of the apparatus as seen along line 3—3 of FIG. 2.
Figure 4:
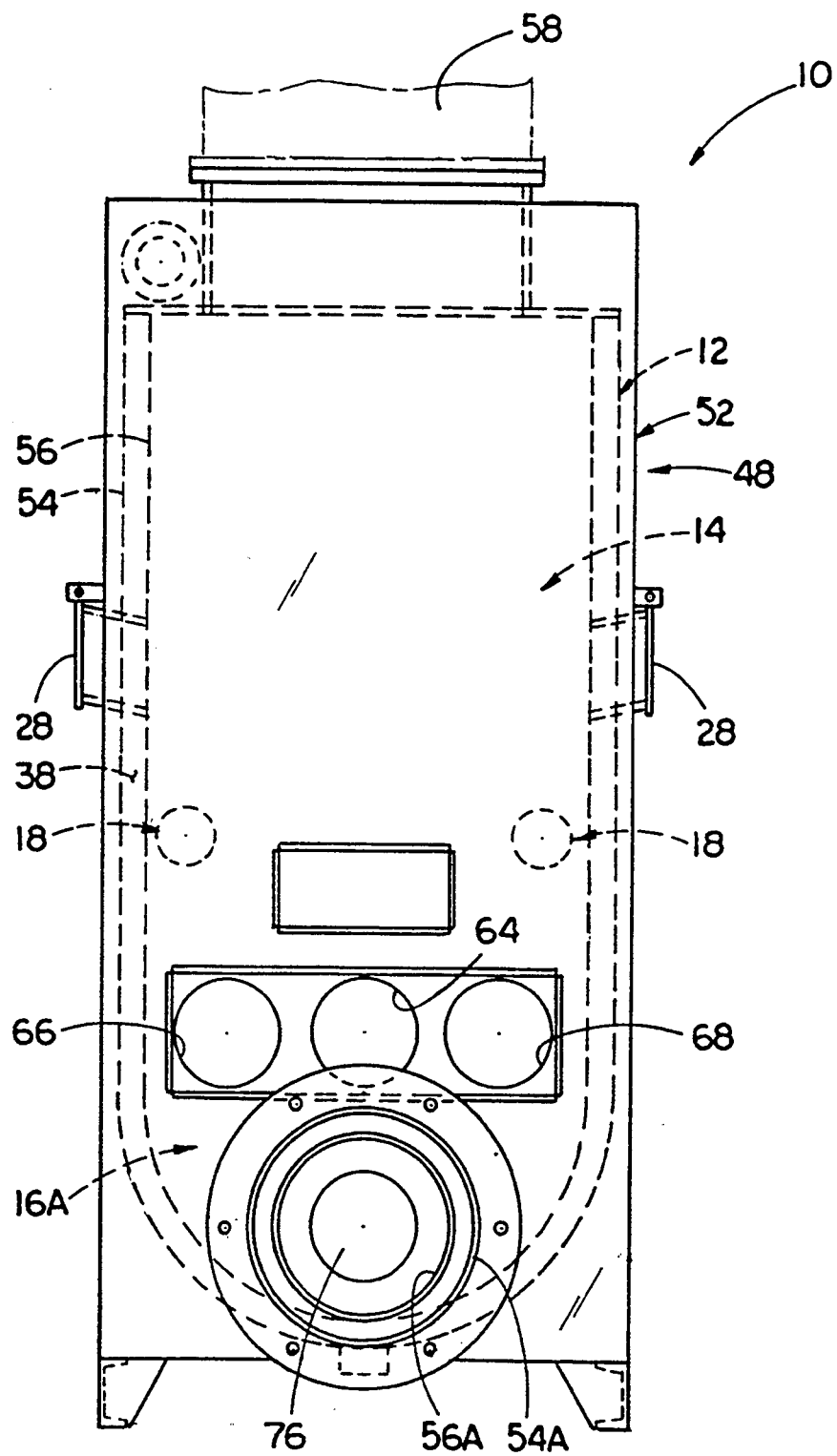
FIG. 4 is an enlarged opposite end elevational view of the first housing unit of the apparatus as seen along line 4—4 of FIG. 2.
Figure 6:
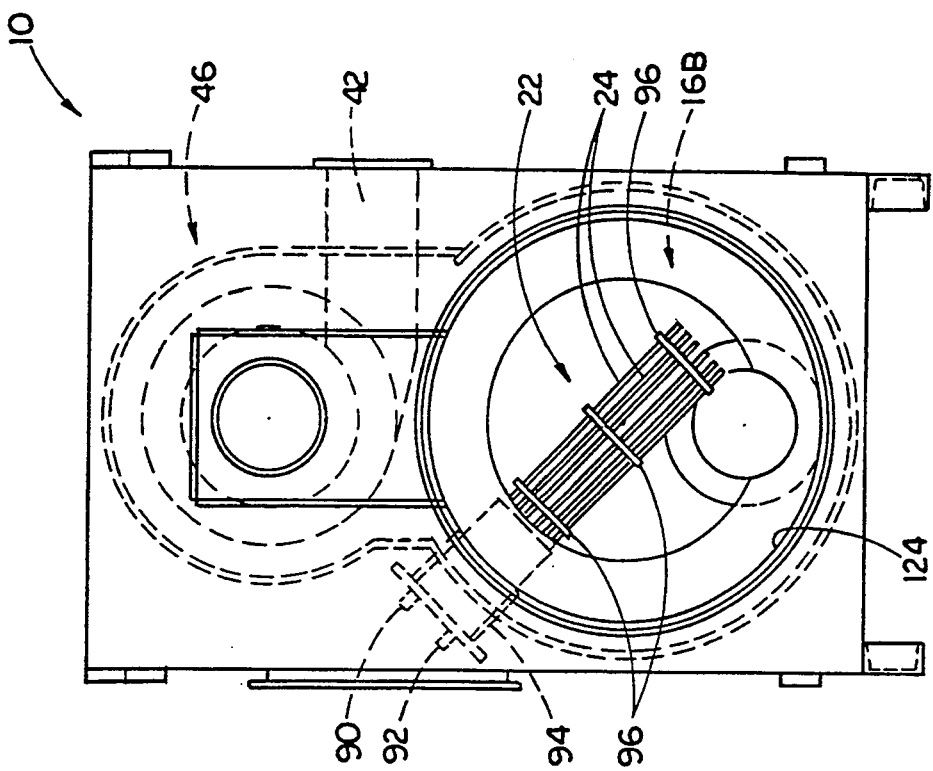
FIG. 6 is an enlarged opposite end elevational view of the second housing unit of the apparatus as seen along line 6—6 of FIG. 2.
Figure 5:
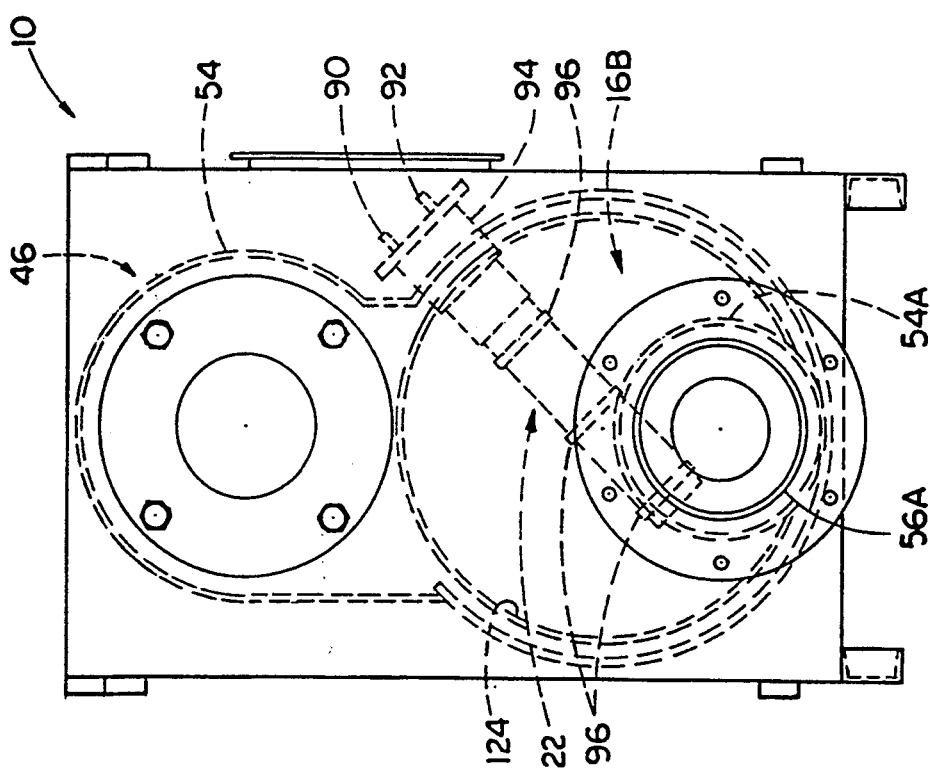
FIG. 5 is an enlarged end elevational view of a second housing unit of the apparatus as seen along line 5—5 of FIG. 2.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Material Processing Apparatus - In General

Referring now to the drawings, and particularly to FIGS. 1, 2, 7, 23 and 24, there is illustrated an apparatus, generally designated 10, for controlled processing of materials, and in particular for controlled disposal of biomedical waste materials, which includes features in accordance with the present invention. The material processing apparatus 10 basically includes a coolant jacketed vessel 12 defining a first pyrolysis chamber 14 and a second oxidation chamber 16. The apparatus 10 also includes one or more first heater units 18 having a plurality of elongated rod-like electric heating elements 20 mounted in the vessel 12 and being operable to electrically generate heat for pyrolyzing materials in the first chamber 14, and one or more second heater units 22 having a plurality of electric heating elements 24 mounted in the vessel 12 and being operable to electrically generate heat for oxidizing materials in the second chamber 16.

The apparatus 10 further includes an air flow generating means, preferably an induction fan 26 and a fan speed controller 27, connected in flow communication with the first and second chambers 14, 16, and first and second airflow inlet valves 28, 30 connected to the jacketed vessel 12. The apparatus also includes an air intake proportioning valve 31 connected in flow communication with the first and second air inlet valves 28, 30. The induction fan 26, proportioning valve 31, and first and second inlet valves 28, 30 function to produce separate primary and secondary variable flows of air respectively into and through the first and second chambers 14, 16. One suitable embodiment of the fan speed controller 27 is a commercially-available unit identified as GPD 503 marketed by Magnetek of New Berlin, Wis. One suitable embodiment of the valves 28, 30 is disclosed in U.S. Pat. No. 4,635,899, the disclosure of which is incorporated herein by reference thereto. One suitable embodiment of the proportioning valve 31 is a pair of conventional air intake butterfly valves controlled by a standard proportioning motor marketed by the Honeywell Corporation. The respective amounts of air in the primary and secondary flows induced and drawn through the first and second chambers 14, 16 by operation of the induction fan 26 are proportioned by the operation of proportioning valve 31 to separately adjust the ratio of the amounts of air flow routed to the first and second air inlet valves 28, 30. The respective amounts of air drawn in the primary and secondary flows are correspondingly varied by varying the speed of operation of the induction fan 26.

Still further at least three temperature sensors 32, 34, 36, such as conventional thermocouples, are mounted on the vessel 12 for sensing the temperatures in the first and second chambers 14, 16 and in the coolant circulating about a channel 38 defined by the jacketed vessel 12 about the first and second chambers 14, 16. Additionally, a gas sensor 40 is mounted on a discharge outlet 42 of the vessel 12 for sensing the concentration of a predetermined gas, for example oxygen, in the discharge gases. Also, a computer-based central control system 44 (FIG. 24) is incorporated in the apparatus 10 for controlling and directing the overall operation of the apparatus 10. One suitable computer which can be employed by the control system 44 is identified as PC-55 marketed by the Westinghouse Electric Corporation of Pittsburgh, Pa.

Figure 7:
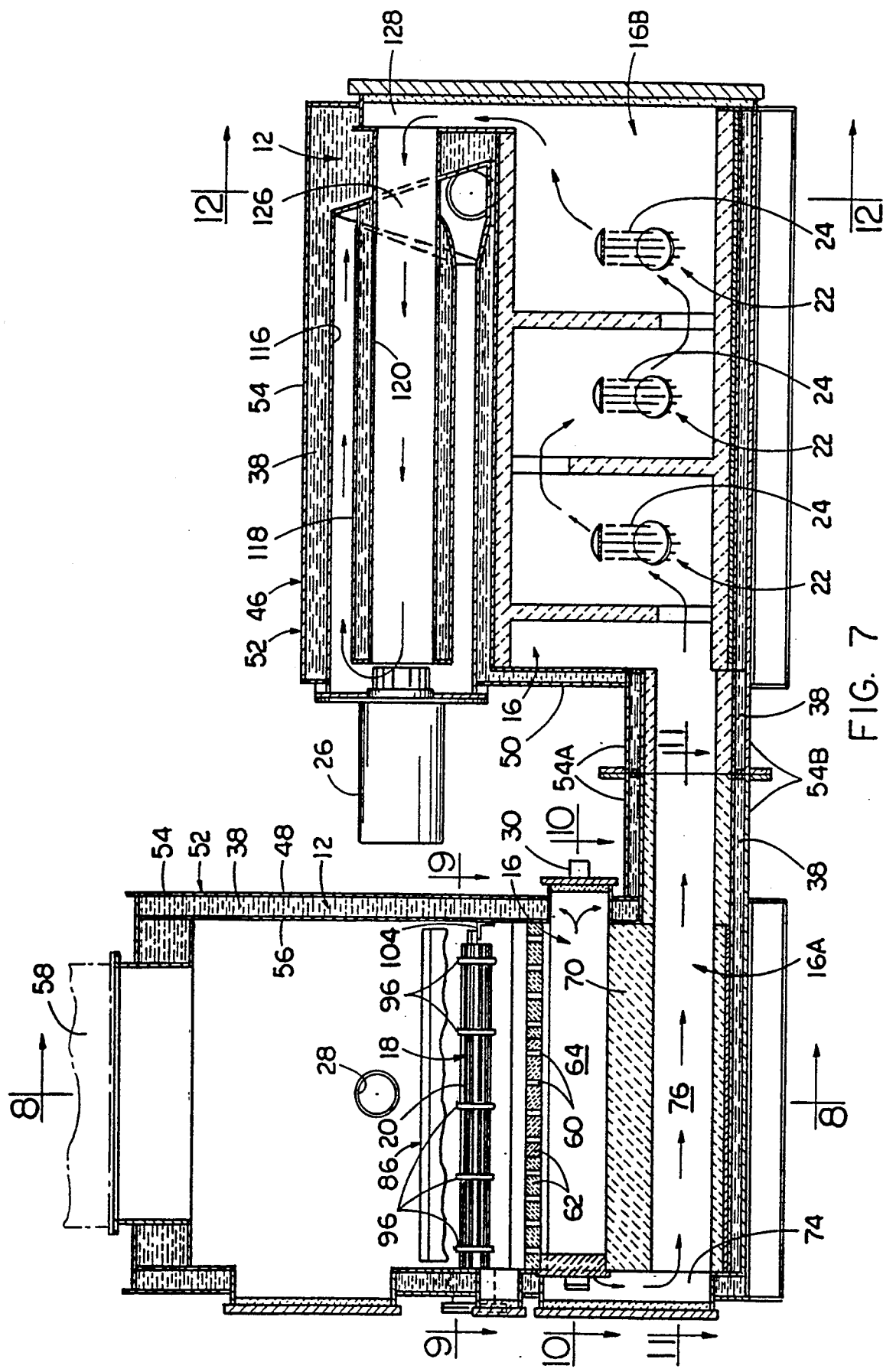
FIG. 7 is a longitudinal vertical sectional view of the apparatus taken along line 7—7 of FIG. 3.
Figure 8:
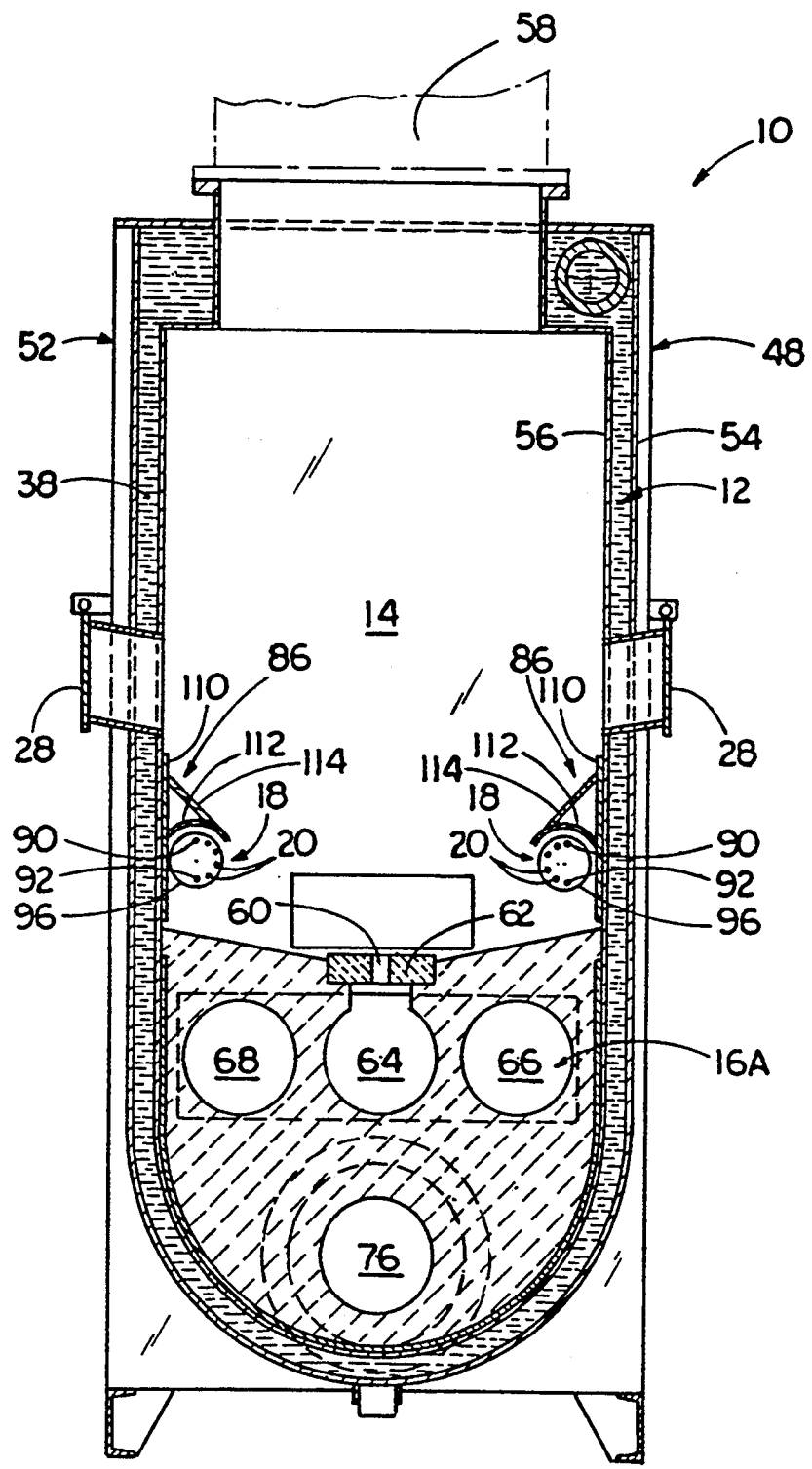
FIG. 8 is an enlarged vertical cross-sectional view of the first housing unit of the apparatus taken along line 8—8 of FIG. 7.
Figure 9:
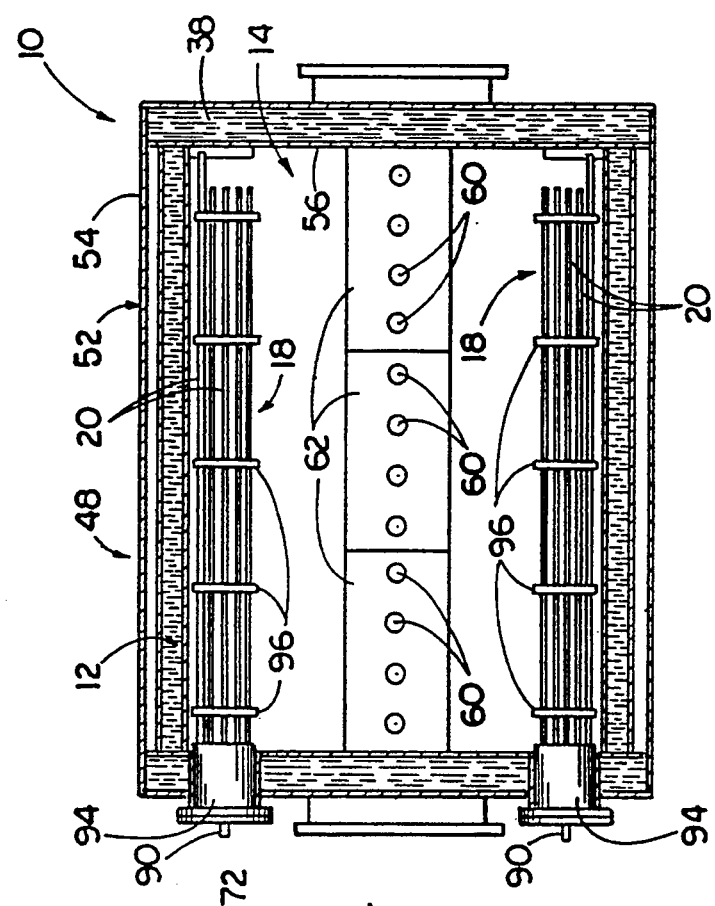
FIG. 9 is an enlarged horizontal cross-sectional view of the first housing unit of the apparatus taken along line 9—9 of FIG. 7.
Figure 10:
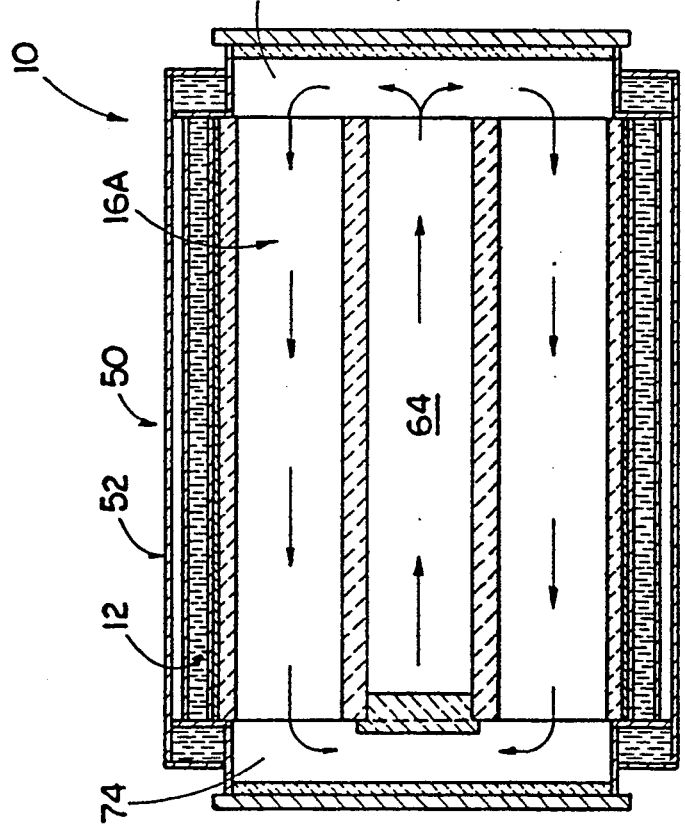
FIG. 10 is another horizontal cross-sectional view of the first housing unit of the apparatus taken along line 10—10 of FIG. 7.
Figure 12:
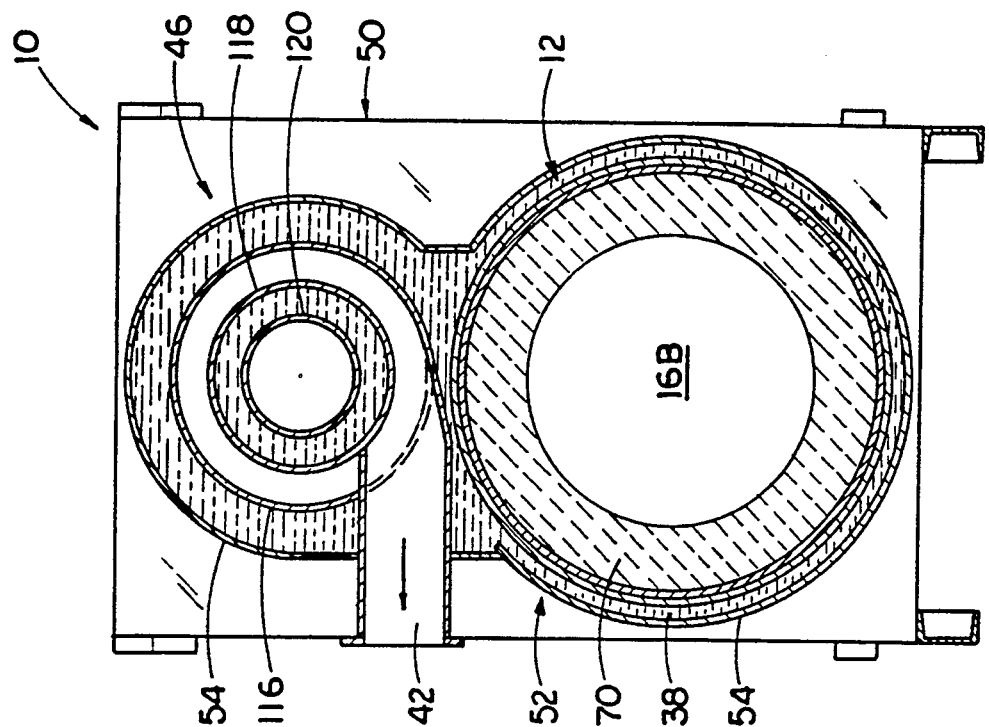
FIG. 12 is an enlarged vertical cross-sectional view of the second housing unit of the apparatus taken along line 12—12 of FIG. 7.
Figure 11:
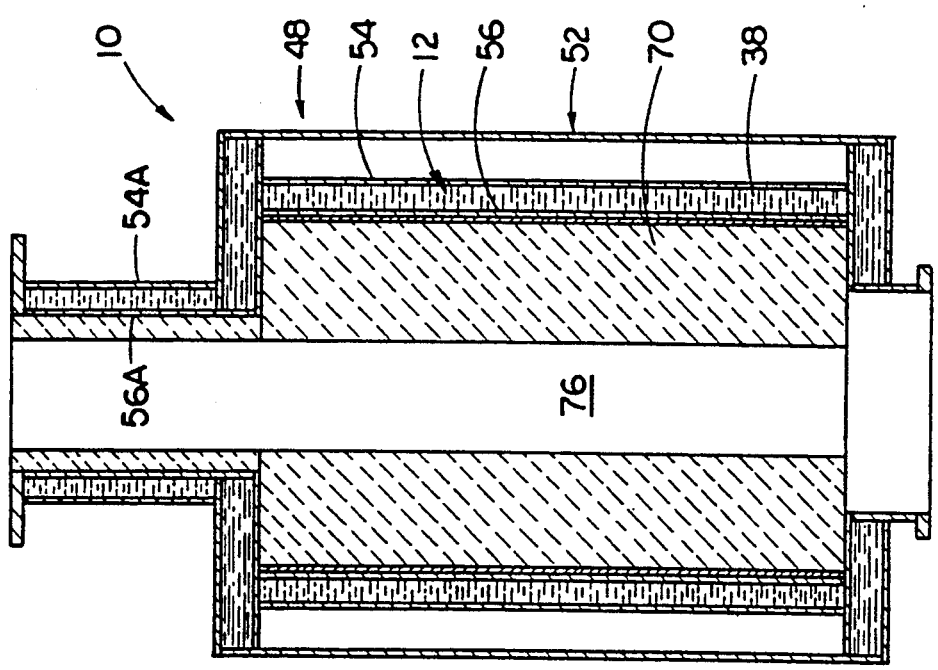
FIG. 11 is still another horizontal cross-sectional view of the first housing unit of the apparatus taken along line 11—11 of FIG. 7.

Further, as seen in FIGS. 7, 12 and 26, the apparatus 10 includes a heat exchanger 46 connected in flow communication between the second chamber 16 and the discharge outlet 42. The heat exchanger 46 functions to remove heat from and thereby cool the coolant flowing through the channel 38 defined by jacketed vessel 12. As pointed out in FIG. 26, the heat removed by the heat exchanger 46 can be employed in other applications in the facility housing the material processing apparatus 10.

Multiple Unit Material Processing Apparatus

Figure 22:
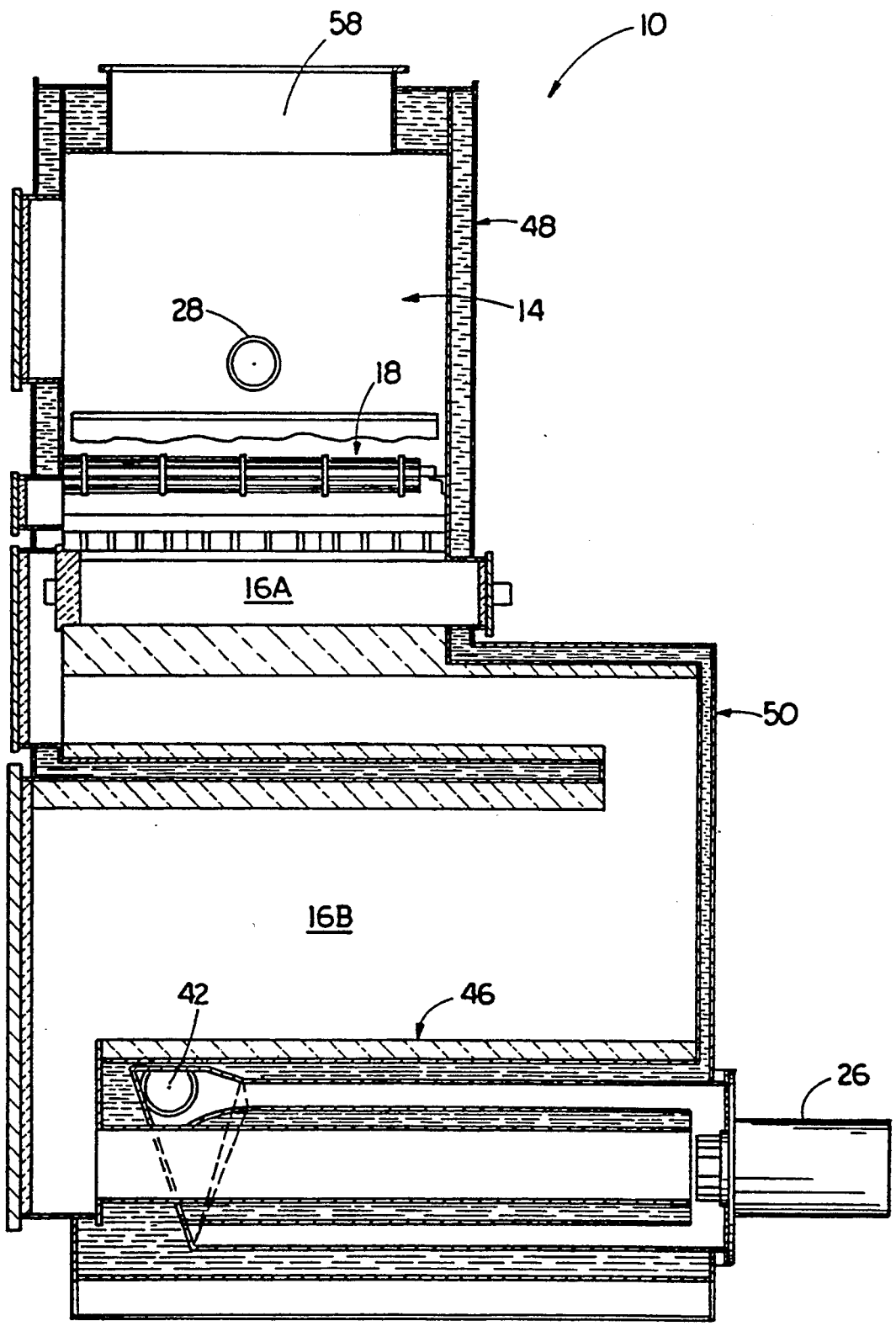
FIG. 22 is a longitudinal vertical sectional view of a modified embodiment of the apparatus.

For many applications, the material processing apparatus 10 can be provided in the form of a single unit where all components of the apparatus are contained within the one unit. However, in order to accommodate space and installation requirements, there are other applications where the material processing apparatus 10 needs to be provided in the form of two separate first and second units 48, 50, as shown in FIGS. 1–12. For example, in some hospital sites, the provision of the apparatus 10 as two separate units 48, 50 permits the apparatus 10 to be transported through existing doorways and hallways and installed in existing rooms. FIGS. 1–12 illustrate an embodiment of the apparatus 10 wherein the first and second units 48, 50 are disposed in end-to-end relation to one another. FIG. 22 illustrates another embodiment of the apparatus 10 wherein the first and second units 48, 50 are disposed one (first) unit 48 above the other (second) unit 50.

Figure 23:
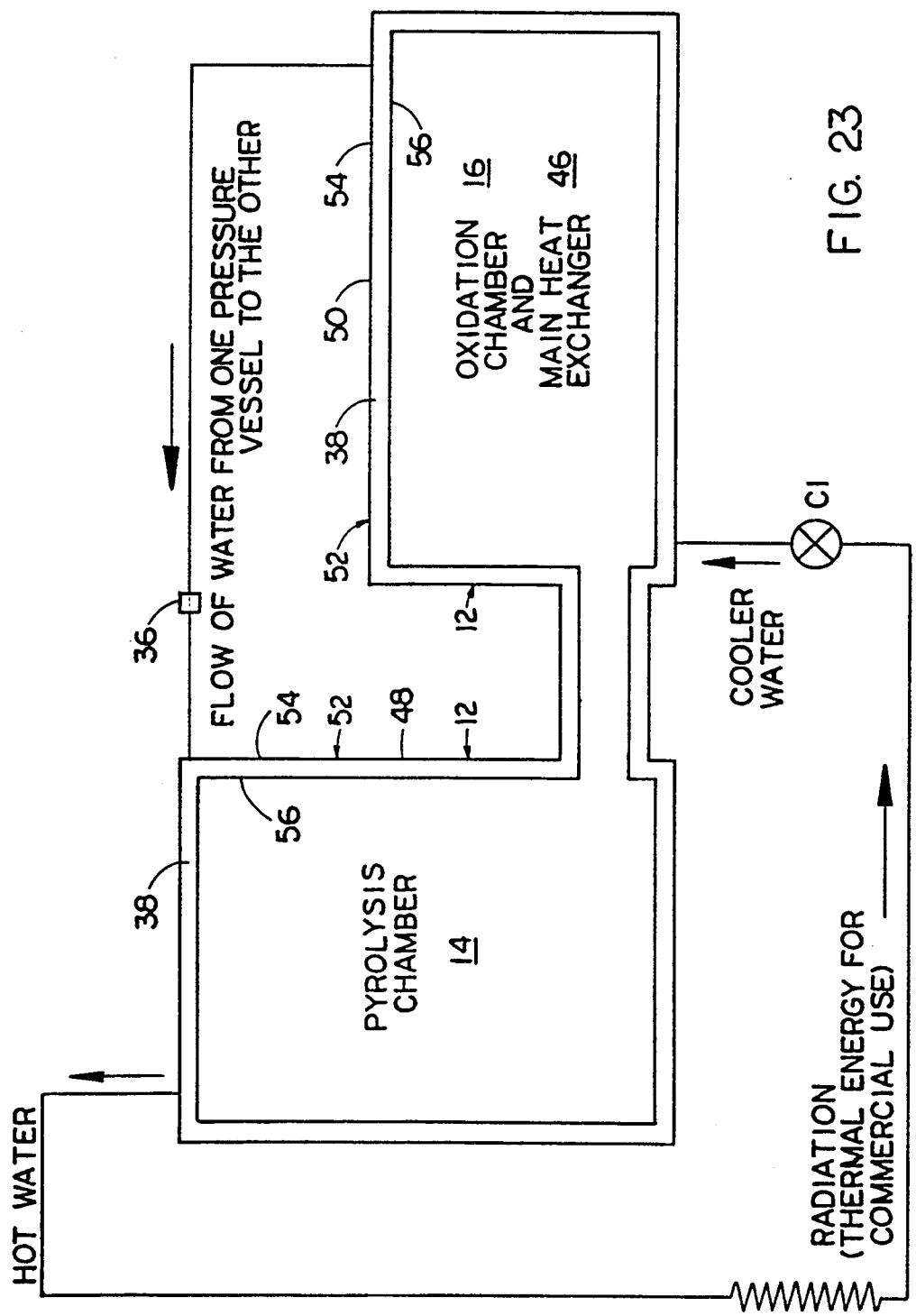
FIG. 23 is a block diagram of a coolant fluid circulation circuit employed by the apparatus of FIG. 1.

Referring to FIGS. 1–12, the material processing apparatus 10 includes a casing 52 having outer and inner spaced walls 54, 56 forming the coolant jacketed airtight pressure vessel 12 inside of the inner wall 56 and the channel 38 between the outer and inner walls 54, 56. The channel 38 surrounds the vessel 12 and contains the flow of coolant fluid, such as water. FIG. 23 illustrates an example of the circulation flow path of the coolant fluid about the vessel channel 38 and between the first and second units 48, 50 of the vessel 12. As mentioned above, the vessel 12 of the apparatus 10 is separated into first and second units 48, 50 and has means in the form of a pair of tubular extensions 54A, 56A of the outer and inner walls 54, 56 which are fastened together to interconnect the first and second units 48, 50 in flow communication with one another.

Figure 24:
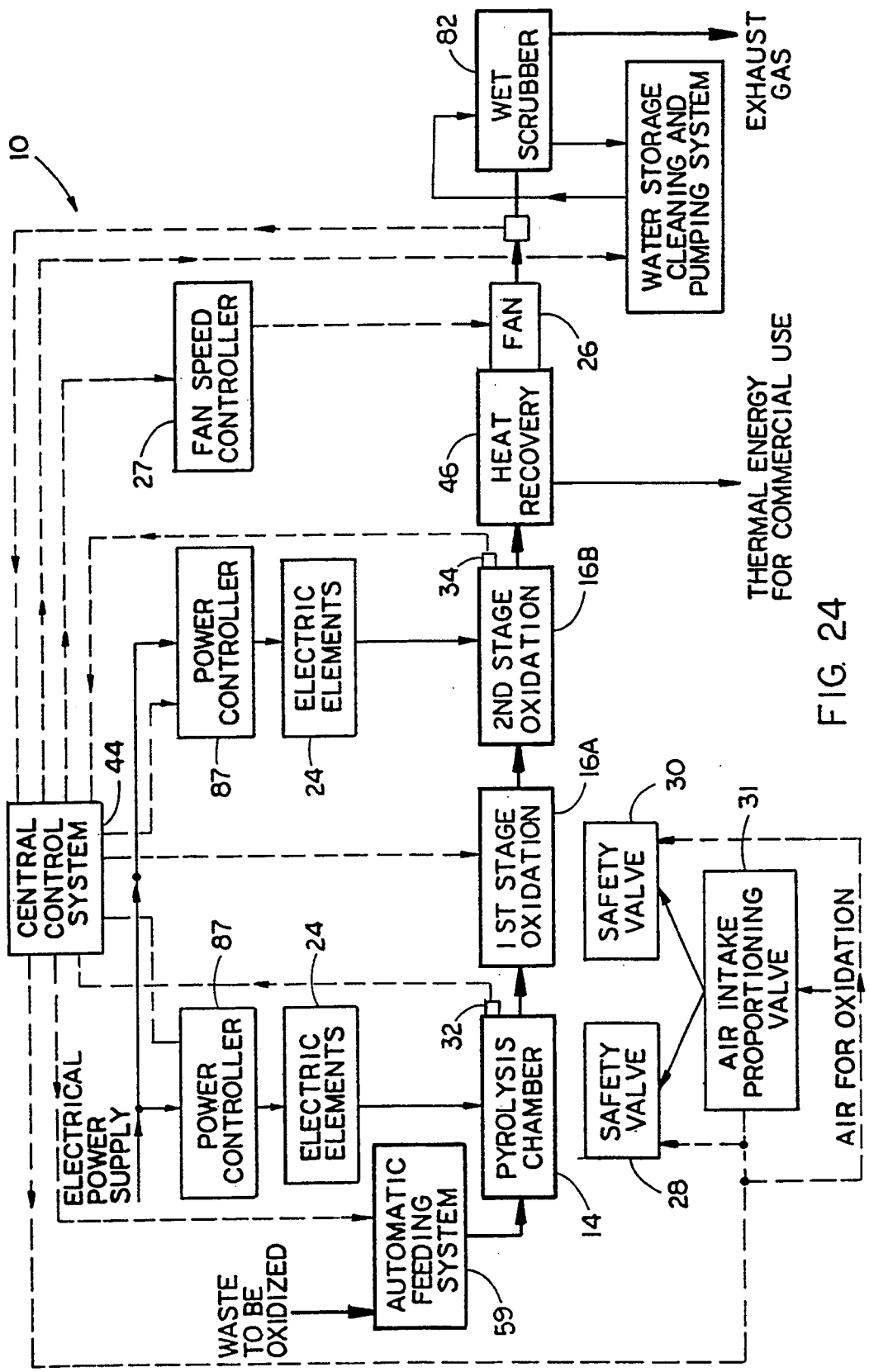
FIG. 24 is a functional block diagram of the material processing apparatus of FIG. 1.

Referring to FIGS. 7–11, the vessel 12 defines the first pyrolysis chamber 14 having an inlet 58 and the second oxidation chamber 16 connected in communication with the first pyrolysis chamber 14 and having the discharge outlet 42. The first chamber 14 in which the materials will be pyrolyzed receives the materials through the inlet 58 via operation of an automatic feeding system 59 (FIG. 24). The first chamber 14 of the vessel 12 for pyrolyzing materials is disposed in the first unit 48. The material, through pyrolysis, or burning in a starved oxygen atmosphere, is converted to a gas that exits the first chamber 14 by passing down through holes 60 in fire brick 62 in the bottom of the first chamber 14 and therefrom to the second chamber 16.

The second chamber 16 receives the pyrolyzed materials from the first chamber 14 and, after oxidizing the pyrolyzed materials therein, discharges the oxidized materials therefrom through the discharge outlet 42. The second chamber 16 has primary and secondary sections 16A, 16B for oxidizing materials in two successive stages. The primary section 16A is disposed in the first unit 48 of the vessel 12 between the first chamber 14 and the tubular extensions 54A, 56A. The secondary section 16B is disposed in the second unit 50 of the vessel 12.

The primary section 16A of the second chamber 16 contains a series of serpentine passages or tunnels 64, 66, 68 defined in a mass 70 of refractory material contained in the first unit 48. The gas passes in one direction through the center tunnel 64 which is plugged at one end, then in reverse direction toward the rear of the first unit 48 to a rear manifold 72, then splits into two gas flows and again reversing in direction to pass toward the front of the first unit 48 through the opposite side tunnels 66, 68 (on the opposite sides of the plugged center tunnel 64), and then to a front manifold 74 where the oxidized gas passes down to a lower tunnel 76.

The secondary section 16B of the second chamber 16 is located in the second unit 50. The oxidized gas from the primary section 16A of the second chamber 16 flows through the lower tunnel 76 in a direction toward the rear of the first unit 48, through the tubular extensions 54A, 54B, and into the secondary section 16B in the second unit 50. The secondary section 16B has a series of spaced air flow baffles 78 with offset openings 80 extending across the flow path of air through secondary section 16B.

The heat exchanger 46 is also located in the second unit 50 above the secondary section 16B of the second chamber 16. The upper heat exchanger 46 has the induction fan 26 connected at one end which operates to draw the gases from the first chamber 14 down through the fire brick 62 into the primary section 16A of the second chamber 16. The gases then flow through the tunnels 64, 66, 68 of the primary section 16A, back through the secondary section 16B of the second chamber 16, then up and forwardly through the center of the heat exchanger 46 to the center of the induction fan 26 which then forces the exhaust gas outwardly and rearwardly around and along the heat exchanger 46 for exiting through discharge outlet 42 into a wet scrubber 82 (FIG. 24). The exhaust gas is virtually free of any pollution and the original material has been almost completely oxidized so that only a very small amount of fine minute dust or powder particles are collected in a particle separator (not shown).

Heat Generator Assembly

Referring to FIGS. 1, 7–9, 13–21, 23 and 24, there is illustrated a pair of heat generator assemblies 84 incorporated in the first chamber 14 of the apparatus 10. The heat generator assemblies 84 are mounted horizontally through the first chamber 14 and adjacent opposite side portions of the inner wall 56 of the casing 52. Each heat generator assembly 84 includes the first heater unit 18 and an elongated deflector structure 86 mounted adjacent to and along the electric heating elements 20 of the first heating unit 18. The first heater unit 18 is mounted to the vessel 12 and extends horizontally into the first chamber 14 between opposite ends thereof and along one of the opposite sides thereof. The first heater unit 18 is powered by a power controller 87 (FIG. 24) which, in turn, is powered by an electrical power supply (not shown) and controlled by the computer-based control system 44 for producing heating of materials received in the first chamber 14 to cause pyrolyzing of the materials into gases. One suitable embodiment of the power controller 87 is a commercially-available unit identified as SSR2400C90 marketed by Omega Engineering of Stanford, Conn. The plurality of elongated electric heating elements 20 extend in generally parallel relation to one another and are constructed of electrically-resistive material operable for emitting heat radiation. The deflector structure 86 extends in circumferential relation partially about the electric heating elements 20 so as to deflect the heat radiation in a desired direction away from the electric heating elements 20 and from the adjacent side of the first chamber 14.

Referring to FIGS. 13–21, in addition to the electric heating elements 20, each first heater unit 18 includes an elongated support member 88 having spaced opposite end portions 88A, 88B, a pair of elongated electrically-conductive positive and negative electrodes 90, 92 each having spaced opposite end portions 90A, 90B and 92A, 92B, and an electrically insulative cylindrical mounting body 94 sealably mounted through the outer and inner walls 54, 56 at the front of the first unit 48 of the casing 52 and supporting the support member 88 and electrodes 90, 92 at corresponding ones of the opposite end portions 88A, 90A, 92A thereof so as to position the support member 88 and electrodes 90, 92 in spaced apart and substantially parallel relation to one another. The one end portions 90A, 92A of the positive and negative electrodes 90, 92 project from the exterior of the front of the casing 52 such that they can be electrically connected to the power supply (not shown) and the control system 44.

Each first heater unit 18 further includes a plurality of spacer elements 96, in the form of electrically-insulative circular discs 96, supported along the support member 88 in spaced relation from one another. The support member 88 includes an elongated rod 98 and a plurality of ceramic sleeves 100 inserted over the rod 98. The sleeves 100 are disposed between the spacer discs 96, positioning them in the desired spaced relationship. The ceramic sleeves 100 and spacer discs 96 are maintained in the desired assembled condition by nuts 102 tightened on the threaded opposite end portions 98A, 98B of the elongated rod 98 of the support member 88. The one end portion 98A of the rod 98 extends through and is supported by the cylindrical mounting body 94, while the other end portion 98B of the rod 98 is supported upon a bracket 104 fixed on the inner wall 56 at a rear end of the first unit 48 of the casing 52.

The spacer discs 96 support the elongated electric heating elements 20 and positive and negative electrodes 90, 92 at spaced locations therealong so as to position the electric heating elements 20 in spaced apart and substantially parallel relation to one another and to the positive and negative electrodes 90, 92 and in an arcuate configuration between the positive and negative electrodes 90, 92 and offset from the support member rod 98. Each spacer disc 96 has an array of holes 106 arranged in asymmetrical relation to a center C of the disc permitting the passage therethrough of the positive and negative electrodes 90, 92 and the electric heating elements 20. Preferably, the electric heating elements 20 and electrodes 90, 92 are spaced along about an 180° arc of a circle. In such manner, the heat energy radiated by the electric heating elements 20 is concentrated and directed on the material and not on the portion of the inner wall 56 of the casing 52 adjacent to the heater unit 18.

The first heating unit 18 also includes means in the form of a plurality of short rod-like connector elements 108 made of electrically-conductive material which electrically connects selected ones of the opposite end portions 20A, 20B of the electric heating elements 20 with selected ones of the opposite end portions 90A, 90B and 92A, 92B of the positive and negative electrodes 90, 92 so as to define an electrical circuit path, having a substantially serpentine configuration, between the positive and negative electrodes 90, 92 and through the electric heating elements 20. The rod-like connector elements 108 are interspaced between and rigidly attached to the selected ones of the opposite end portions of the electric heating elements 20 and the positive and negative electrodes 90, 92.

Each of the second heater units 22 employed in the secondary section 16B of the second chamber 16 has substantially the same construction and configuration as the first heater unit 18 described above with one difference. The difference is that the electric heating elements 24 of the second heater unit 22 are distributed and spaced about the full circle instead of only about one-half of the circle. The second heater units 22 are also powered by another power controller 87.

Thus, the first heater units 18 in the first chamber 14 are specifically designed and positioned so that the electric heating elements 20 are disposed away from the side portions of the inner wall 54 of the vessel 12. The deflector structure 86 associated with each first heater unit 18 serves to deflect the flow of gases away from the electric heating elements 20 and thus protect them from damage and also serve to direct the heat radiated by the electric heating elements 20 away from the inner wall 56. The deflector structure 86 includes a planar mounting plate 110 attached to the adjacent side portion of the inner wall 56, an arcuate shield 112 extending along the mounting plate 110, and means in the form of one or more braces 114 rigidly attaching the arcuate shield 112 along the mounting plate 110. The arcuate shield 112 overlies and surrounds approximately the upper one-third, or 120°, of the circular heater unit 18.

Casing And Heater Configuration

Referring to FIGS. 1, 5–7 and 12, as described earlier the second unit 50 of the casing 52 includes therein the lower secondary section 16B of the second chamber 16 and the upper heat exchanger 46. Also, the secondary section 16B of the second chamber 16 includes a plurality, for example three, of the second heater units 22 and the baffles 78.

In order to provide access from the exterior of the casing 52 for mounting the second heater units 22 through spaced side portions of the outer and inner walls 54, 56 of the casing 52 and within the second chamber 16, the outer wall 54 of the second unit 50 of the casing 52 has a unique configuration. The outer wall 54 has a substantially one-sided figure eight configuration so as to accommodate positioning of the second heater units 22 through the spaced side portions of the outer and inner walls 54, 56 of the casing 52 to extend across the second chamber 16 in orientations positioned intermediately, such as about 45°, between vertical and horizontal orientations.

Further, in the second unit 50 the inner wall 56 of the casing 52 is provided in the form of a plurality of upper inner walls 116, 118, 120, 122 having substantially concentric cylindrical configurations, and a lower inner wall 124. The concentric upper inner walls 116, 118, 120, 122 define an upper airtight portion of the vessel 12 which, in turn, defines the heat exchanger 46. The lower inner wall 124 defines a lower airtight portion of the vessel 12 which contains the secondary section 16B of the second chamber 16. An inner manifold 126 is defined at the rear end of the second unit 50 of the casing 52 between the outer wall 54 and the rear end portions of the concentric inner walls 116, 118, 120, 122 so as to provide extension 38A of the channel 46 into the heat exchanger 46 for providing flow communication of the coolant through the heat exchanger 46. An outer manifold 128 is defined also at the rear end of the second unit 50 of the casing 52 for providing flow communication of gases from the secondary section 16B of the second chamber 16 through the heat exchanger 46 to the discharge outlet 42.

Overview of Operation of Computer-Based Control System

Figure 25B:
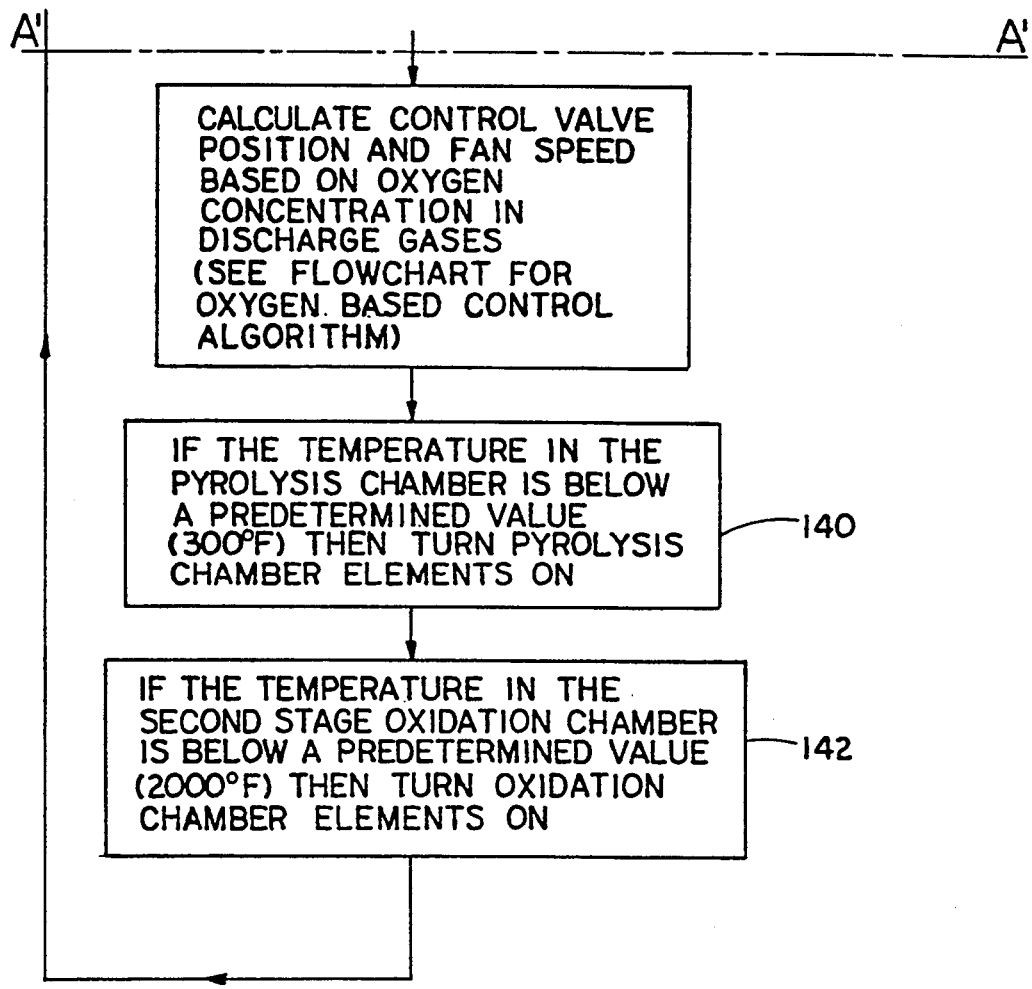
Figure 26A:
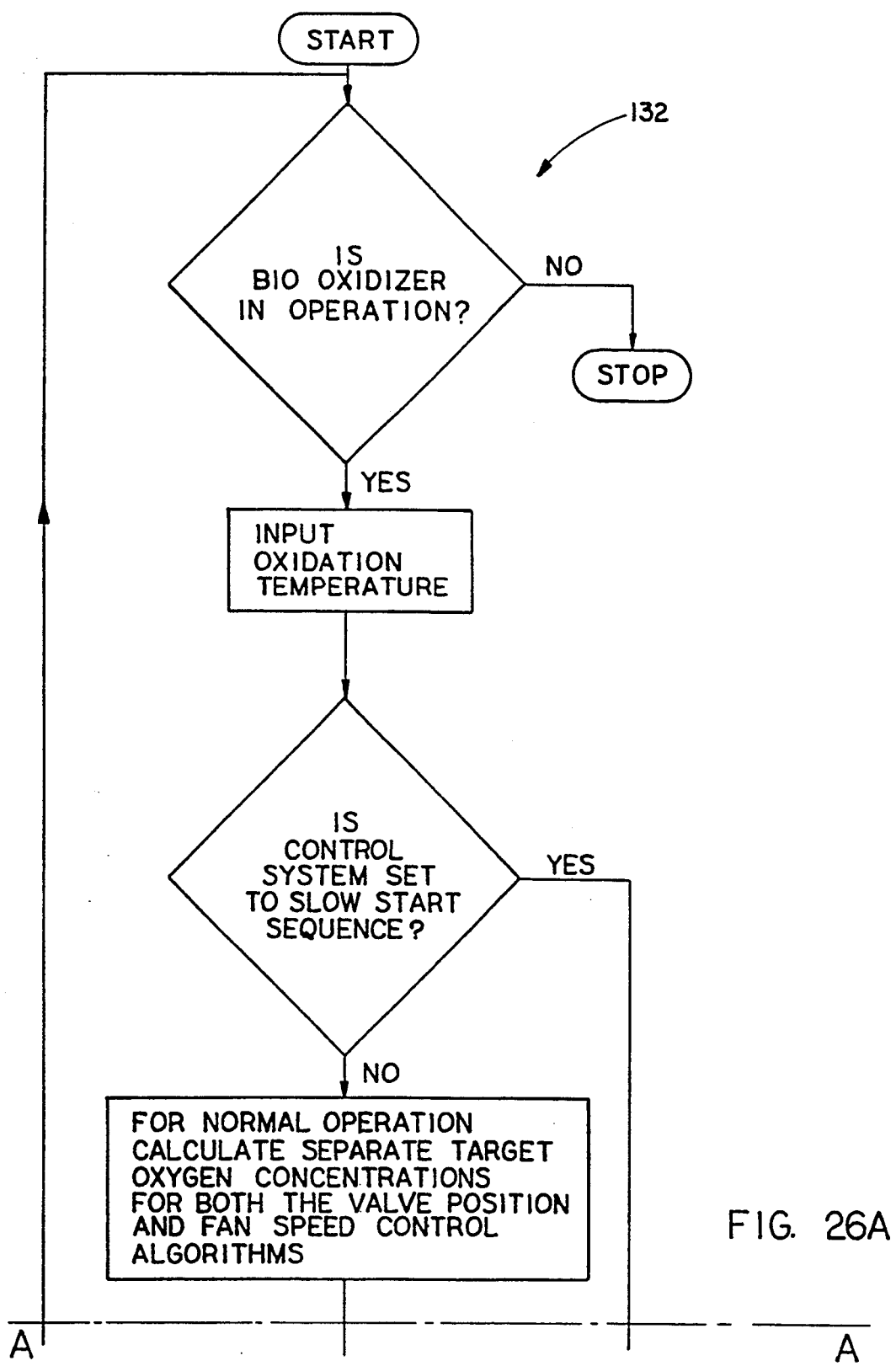
FIGS. 26A and 26B, taken together, show another flow chart of the operation of an oxygen-based control algorithm employed by the apparatus of FIGS. 1 and 24.
Figure 26B:
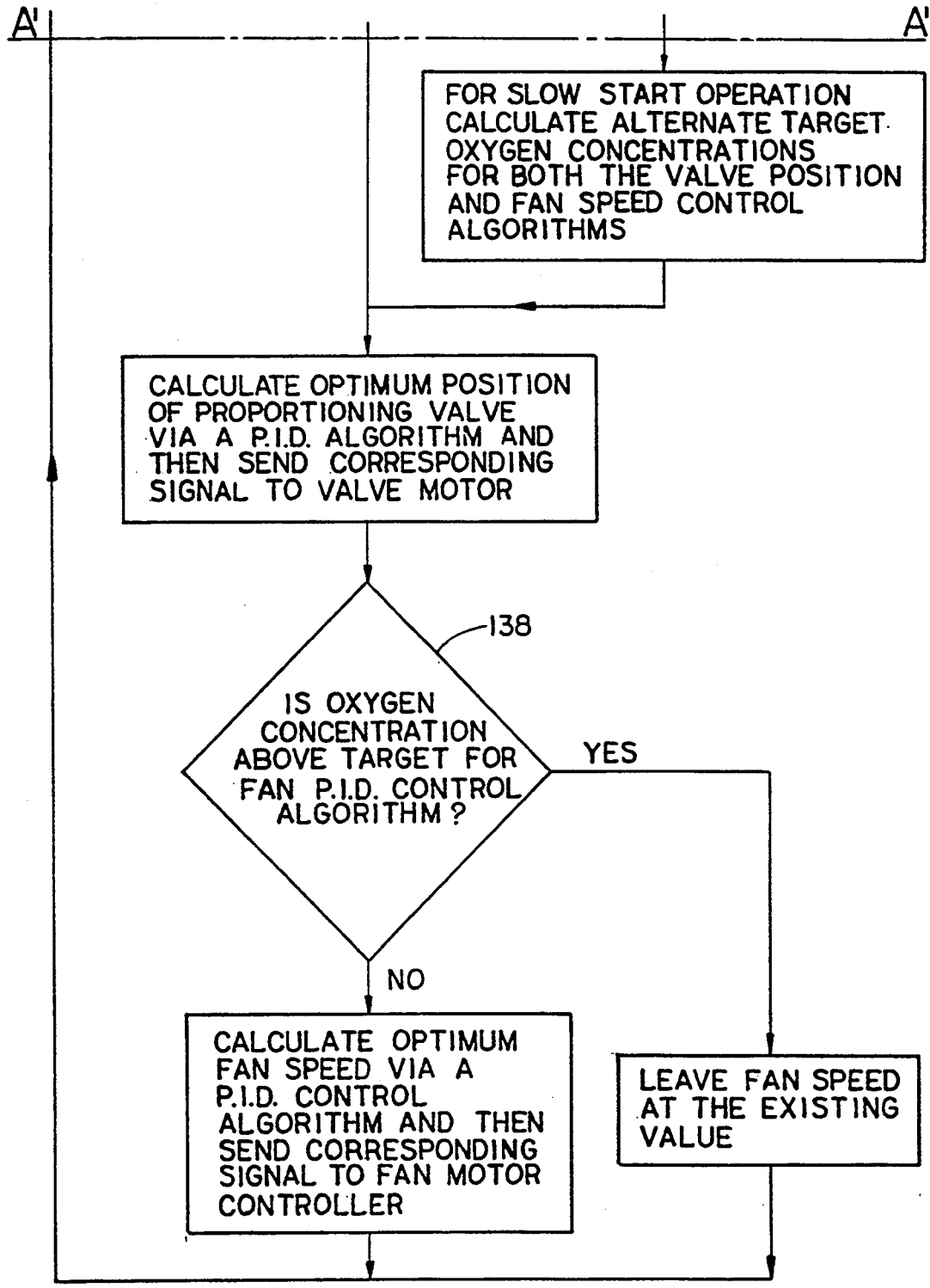
Figure 27:
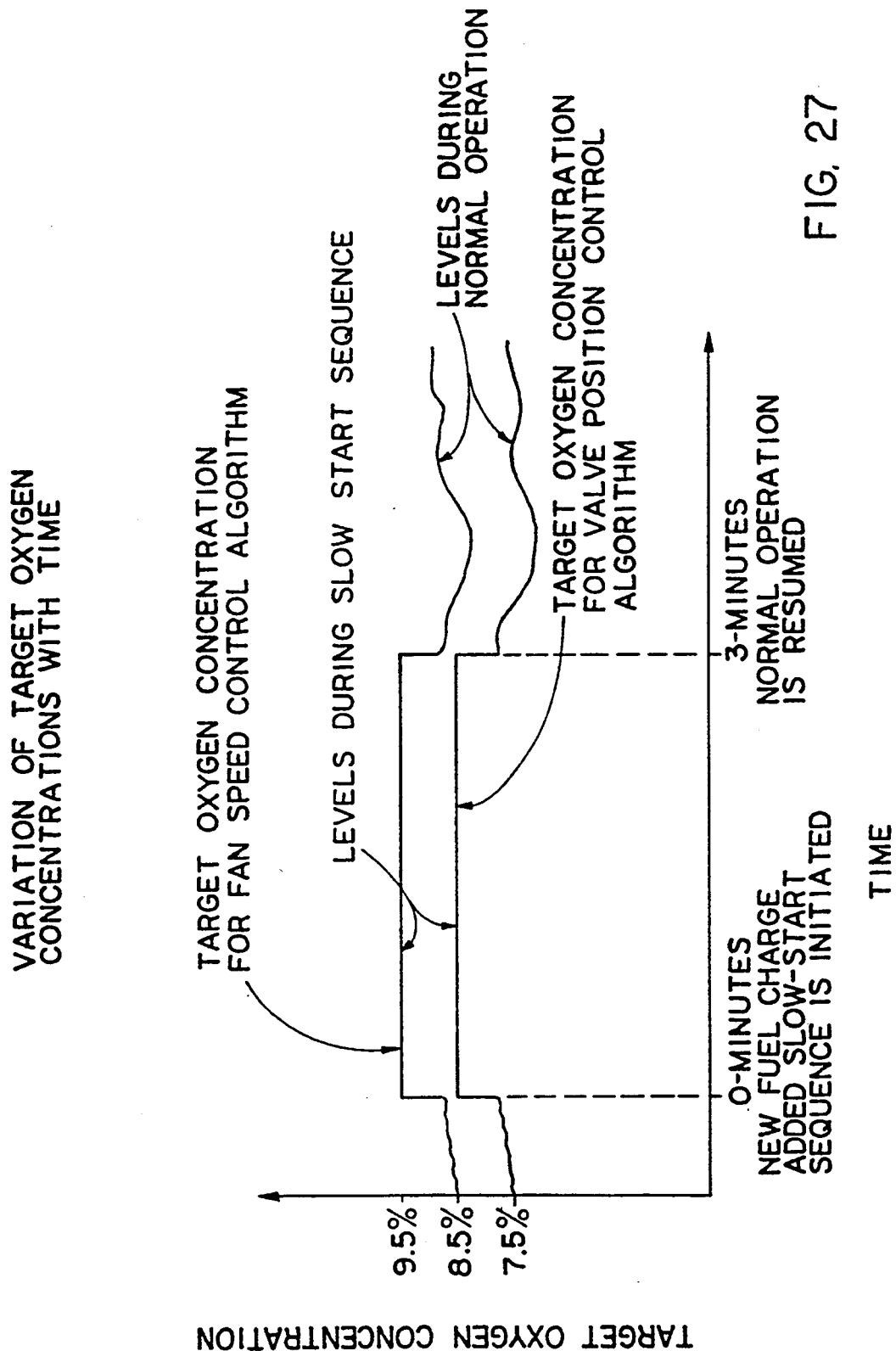
FIG. 27 is a graph of the target oxidation concentrations verses time.

Referring to FIGS. 24–26, there is functionally illustrated the components of and the operative steps performed by the material processing apparatus 10 under the monitoring and control of the computer-based central control system 44 for effecting optimal pyrolyzing and oxidizing of the materials therein. FIG. 24 provides a functional block diagram of the material processing apparatus 10 illustrating the directions of interactions between the components of the apparatus 10. FIGS. 25A and 25B, taken together, depict a flow chart 130 of an exemplary sequence of software or program steps executed in the central control system 44 for controlling and directing the overall operation of the material processing apparatus 10. FIGS. 26A and 26B, taken together, depict another flow chart 132 of an exemplary oxygen-based control algorithm utilized by the software program in the central control system 44 to carry out the proportioning of the air flow through the first and second chambers 14, 16 of the apparatus 10. While flow charts 130 and 132 are believed to be substantially self-explanatory and readily understood by a person having ordinary skill in this art, certain of the features of the control system 44 with reference to the flow charts are described hereinafter.

Basically, the material processing apparatus 10 operates through one cycle to process, that is, to pyrolyze and oxidize, a predetermined batch of material, such as biomedical waste material. The central control system 44 functions to operate and regulate the material processing apparatus 10 during each batch processing cycle by controlling the operation of the first and second heater units 18, 22, the position of the air intake proportioning valve 31 and the speed of the induction fan 26. The central control system 44, under control and direction of a software program stored in its internal memory, repetitively and at high speed, receives inputs, processes the inputs and generates outputs. The inputs received by the central control system 44 from the various temperature and gas sensors 32, 34, 36, 40 contain information about the current states of the pyrolysis process occurring in the first chamber 16 and of the oxidation process occurring in the primary and secondary sections 16A, 16B of the second chamber 16. A Proportional, Integral, Derivative (PID) control algorithm for regulating induction fan speed and proportioning valve position are contained in the software program. These algorithms are employed by the central control system 44 to process the inputted information by integrating the information into a logical sequence of decision steps and then generating an appropriate set of output instructions to ensure that the pyrolysis and oxidation processes continue at an optimum level.

More particularly, the control system 44 is responsive to the temperatures sensed in the first and second chambers 14, 16 by temperature sensors 32, 34 and in the coolant circulating through the channel 38 of the jacketed vessel 12 by temperature sensor 36. The control system 44 also is responsive to the proportion of the predetermined gas, such as oxygen, sensed in the discharge gases by gas sensor 40. The control system 44, in response to these various temperatures sensed and to the proportion of oxygen sensed, functions to control the position of the air intake proportioning valve 31 so as to adjust the ratio of, or proportion, the amount of primary air flow to the amount of secondary air flow through the first and second inlet valves into the first and second chambers 14, 16. Also, the control system 44, in response to these various temperatures sensed and to the proportion of oxygen sensed, functions to control the operation of the induction fan 26 via the fan speed controller 27 so as to adjust the amounts (but not the proportion) of primary and secondary air flows into the first and second chambers 14, 16.

Figure 28:
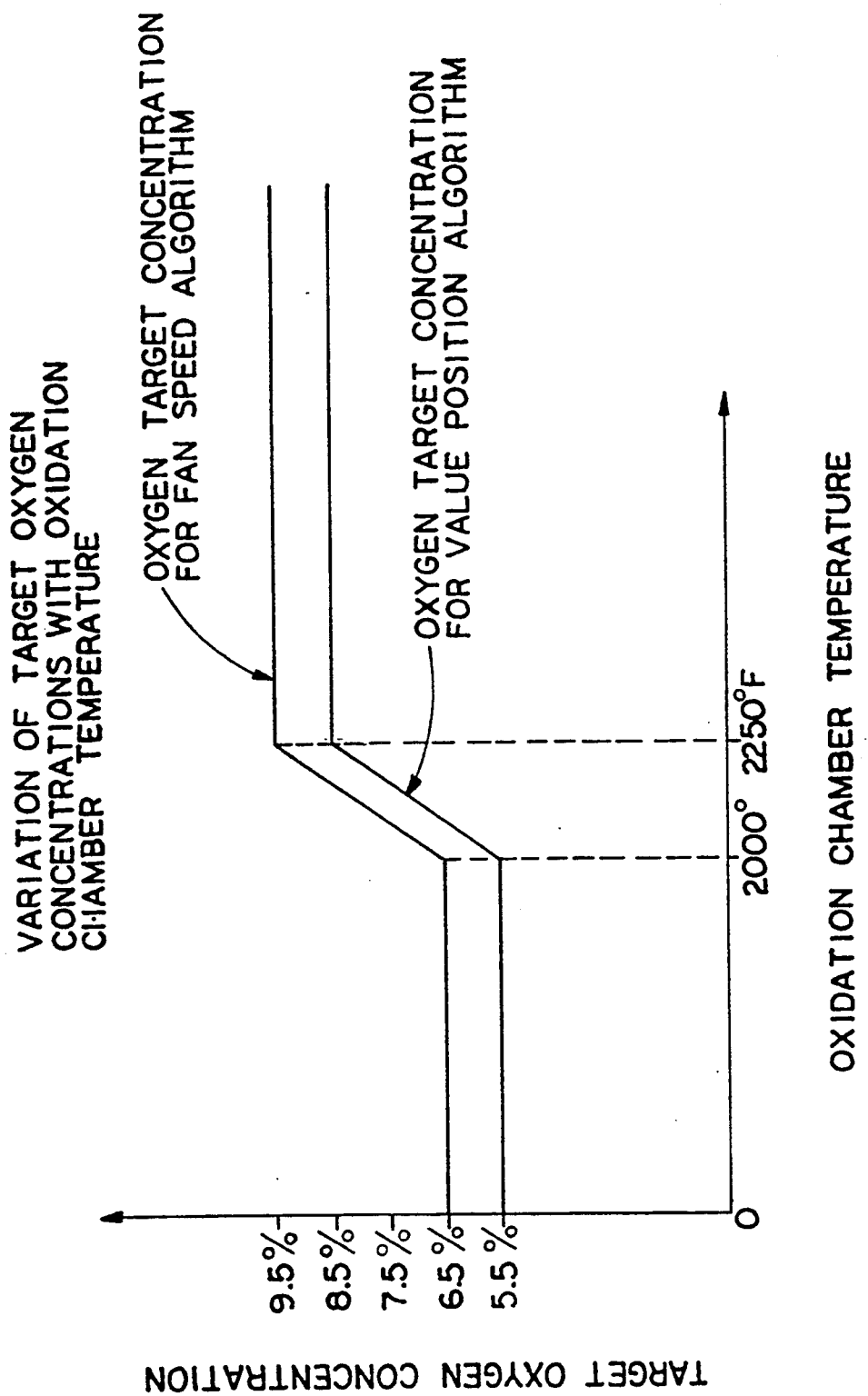
FIG. 28 is a graph of the target oxidation concentrations verses oxidation chamber temperatures.

Referring to the flow chart 130 of FIGS. 25A and 25B, at initiation of a new batch processing cycle, the central control system 44 will first determine from the inputted information if the conditions existing in the first and second chambers 14, 16 are such as to allow the apparatus 10 to operate (as per diamond 134) and to allow adding of the new batch to the first chamber 14 of the apparatus 10 (as per diamond 136). If the answer to diamond 134 is "yes", then the components of the apparatus 10 are set into operation to cause an initial heating or warm-up of the chambers 14, 16. If the answer to diamond 136 is "yes", then the new batch is loaded into the first chamber 14 and a slow-start sequence is initiated. To accommodate for the possibility of a rapid increase in the pyrolysis rate when a new fuel charge is added, the control system initiates a slow-start sequence. When the control system is executing the slow-start sequence, it essentially raises the target oxygen concentrations for a preset period of time as illustrated in the graph seen in FIG. 28.

During the pyrolyzing and oxidizing processing cycle of the apparatus 10, the required temperatures and correct primary and secondary air flows must be maintained in the first and second chambers 14, 16 in order to obtain the desired ultimate results. The inputs of oxygen concentration compared to a desired target level (for example 6%) as per diamond 138 of the flow chart 132 of FIGS. 26A and 26B and of temperatures in the first and second chambers 14, 16 compared to desired target levels (for example, 300° F. and 2000° F.) as per blocks 140, 142 of flow chart 130 of FIG. 25 are received and processed by the central control system 44 to control the position of the proportioning valve 31 to set the primary and secondary air flows and to control the speed of the induction fan 26 in order to maintain the pyrolyzing and oxidizing processes at optimum levels. For example, if the level of oxygen concentration sensed in the discharge outlet 42 is too high, then that means that insufficient pyrolysis is occurring in the first chamber 14. To rectify this condition, the ratio of the primary and secondary air inflows is changed by regulating the air intake proportioning valve 31 to increase the amount of air flow entering the first chamber 14 and to decrease the amount of air flow entering the second chamber 16. If the level of oxygen concentration sensed is still too high, then that means that the amount of air in both the primary and secondary flows needs to be decreased by slowing down the speed of the induction fan 26. If the elevated oxygen concentration condition were to persist, the excess air inflow will cool down the chambers below the target levels. The first and second heater units 18, 22 are employed to preheat the chambers 14, 16 and to ignite the oxidation process and also to raise the temperatures of the chambers whenever their temperatures decrease below target levels.

The fan speed control algorithm and air flow proportioning algorithm also establish the rates at which corrective actions are taken in order to ensure that the pyrolysis and oxidation processes continue at an optimum level. The rates at which the necessary corrective changes occur are higher when too little oxygen is sensed in the discharge gases than when too much oxygen is sensed. This is because too little oxygen indicates a more serious situation such being that inadequate oxidation is occurring and, therefore, potentially pollution-causing gases are being exhausted by the apparatus 10. Therefore, for example, the rate at which changes in fan speed and proportioning of primary and secondary air flows occur when an oxygen deficit condition is sensed can be twice the rate at which the same changes occur when an oxygen surplus condition is sensed. As illustrated by the graph seen in FIG. 28, target oxygen concentrations are varied as the oxidation chamber temperature varies.

Interdependent control of the fan speed and the valve position based on oxygen concentration in the stack gases is one of the key aspects for controlling the processing of materials in the processing apparatus 10. Utilizing two separate enhanced PID (Proportional, Integral, Derivative) algorithms, the fan speed and valve position are varied as the stack gas oxygen concentration varies. Currently, the target oxygen level for the fan control PID algorithm is pegged at 1% higher than the target oxygen level for the valve PID algorithm. If the valve position is below 100% air flow to the pyrolysis chamber, the fan speed is not allowed to decrease. The control system is programmed this way so it will encourage maximum throughput while maintaining stable operating conditions. To assist the reader in understanding how the two PID control algorithms relate to each other, sample situations are provided below:

(a) Observed Oxygen Level: 5%
Fan PID Algorithm Oxygen Target: 6%
Valve PID Algorithm Oxygen Target: 7%
  Fan speed will increase; and
  Valve position decreases air to pyrolysis chamber.
(b) Observed Oxygen Level: 6.5%
Fan PID Algorithm Oxygen Target: 6%
Valve PID Algorithm Oxygen Target: 7%
  Fan speed will increase; and
  Valve position increases air to pyrolysis chamber.
(c) Observed Oxygen Level: 8%
Fan PID Algorithm Oxygen Target: 6%
Valve PID Algorithm Oxygen Target: 7%
  Fan speed will hold until the valve position increases to 100% to the pyrolysis chamber and then it will decrease; and
  Valve position increases air to pyrolysis chamber.

It should be noted that when the sensed oxygen level falls below the target level for the fan speed, the gain setting of the fan speed PID control algorithm is double to that of when it is above this target level. The same is true for the valve position PID control algorithm. Its gain also doubles when the oxygen level falls below the target oxygen level for the valve. (The gain setting of a PID control algorithm is a parameter which sets the rate of compensation for a given change in the monitored variable—in this case the oxygen level).

The use of the oxygen concentration level in the discharge gases as the means to proportion primary and secondary air flows is preferred but not essential to the proper functioning of the apparatus 10. The concentrations of other gases such as carbon dioxide, instead of oxygen, could be sensed and measured.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

I claim:

1. An apparatus for controlled processing of materials, comprising:
   (a) a casing having outer and inner spaced walls forming an airtight vessel inside of said inner walls thereof and a channel between said outer and inner walls surrounding said vessel and containing a flow of coolant fluid through said channel;
   (b) means for forming a first chamber in said airtight vessel of said casing being capable of receiving feed materials to be processed;
   (c) means in communication with said first chamber for producing heating in said first chamber to cause pyrolyzing of the feed materials into fluid materials;
   (d) means for forming a second chamber in said airtight vessel of said casing communicating with said first chamber;
   (e) a discharge location formed through said walls of said casing communicating said second chamber to the exterior of said casing, said second chamber being capable of receiving the fluid materials from said first chamber and communicating the fluid materials to said discharge location;
   (f) means in communication with said second chamber for producing heating in said second chamber to cause oxidizing of the fluid materials into discharge gases;
   (g) means for producing separate variable flows of primary and secondary air through said walls of said casing and respectively into and through said first and second chambers and from said second chamber to said discharge location, said variable air flow producing means including
      (i) first air flow regulating means connected in communication with said first chamber for regulating the flow of air into said first chamber,
      (ii) second air flow regulating means connected in communication with said second chamber for regulating the flow of air into said second chamber, and
      (iii) air flow generating means coupled in flow communication between said second chamber and the exterior of said casing and being operable to draw said primary flow of air through said first air flow regulating means into and through said first chamber and therefrom through said second chamber to said air flow generating means and said discharge location and to draw said secondary flow of air through said second air flow regulating means into and through said second chamber to said air flow generating means and said discharge location;
   (h) means for sensing the temperatures in said first and second chambers;
   (i) means for sensing the temperature of said coolant flow through said channel between said outer and inner walls of said casing;
   (j) means for sensing the concentration of a predetermined gas in the discharge gases;
   (k) air flow proportioning means coupled to said respective first air flow regulating means and second air flow regulating means and being operable to control said respective first air flow regulating means and second airflow regulating means so as to proportion the respective amounts of primary and secondary flows of air drawn through said respective first air flow regulating means and second air flow regulating means into said respective first and second chambers to said air flow generating means and said discharge location; and
   (l) means responsive to the temperatures sensed in said first and second chambers and in said coolant flow through said channel between said outer and inner walls of said casing and to the concentration of the predetermined gas sensed in the discharge gases for controlling speed of operation of said air flow generating means to control the amount of flow of air drawn through said respective first air flow regulating means and second air flow regulating means into said respective first and second chambers and for controlling said airflow proportioning means to proportion the respective amounts of primary and secondary air flows drawn through said respective first air flow regulating means and second air flow regulating means into said respective first and second chambers and thereby to control the heating in the first and second chambers in order to maintain effective pyrolyzing and oxidizing of the feed materials therein.

2. The apparatus as recited in claim 1, further comprising:
   means for forming a heat exchanger being connected in flow communication between said second chamber and said discharge location.

3. The apparatus as recited in claim 1, wherein said air flow generating means is an induction fan.

4. The apparatus as recited in claim 1, wherein:
   said first air flow regulating means is a first airflow inlet valve connected in flow communication with said first chamber and being operable to permit entry of said flow of primary air into said first chamber; and
   said second air flow regulating means is a second airflow inlet valve connected in flow communication with said second chamber and being operable to permit entry of said flow of secondary air into said second chamber.

5. The apparatus as recited in claim 4, wherein said air flow proportioning means is operable to proportion the respective amounts of primary and secondary air flows through said first and second airflow inlet valves into said first and second chambers.

6. The apparatus as recited in claim 4, wherein said air flow generating means is an induction fan.

7. The apparatus as recited in claim 1, wherein said predetermined gas in the discharge gases sensed by said gas sensing means is oxygen.

8. The apparatus as recited in claim 1, wherein said means for producing heating in said first chamber includes:
   a plurality of elongated electric heating elements extending in generally parallel relation to one another and being operable for emitting heat radiation; and means for mounting said electric heating elements in spaced relation from and along a portion of said inner wall of said casing.

9. The apparatus as recited in claim 8, wherein said means for producing heating in said first chamber further includes means for partially encircling said electric heating elements adjacent to said casing wall for deflecting said heat radiation away from said wall and into said chamber.

10. The apparatus as recited in claim 1, wherein said means for producing heating in said second chamber includes:
- a plurality of elongated electric heating elements extending in generally parallel relation to one another and being operable for emitting heat radiation; and
- means for mounting said electric heating elements across said second chamber in an orientation intermediate between vertical and horizontal orientations.

11. The apparatus as recited in claim 1, further comprising:
- a heat exchanger contained in said casing above and connected in flow communication between said second chamber and said discharge location.

12. The apparatus as recited in claim 1, wherein said casing includes first and second units spaced from one another and means disposed between said first and second units for connecting said units in flow communication with one another.

13. The apparatus as recited in claim 1, wherein said casing includes first and second units with one of said units being disposed above the other of said units, said casing also including means for connecting said first and second units in flow communication with one another.

14. The apparatus as recited in claim 1, wherein said second chamber has a pair of primary and secondary sections for oxidizing the material in two successive stages.

15. The apparatus as recited in claim 14, wherein said primary section of said second chamber has a series of interconnected serpentine passages.

16. The apparatus as recited in claim 14, wherein said secondary section of said second chamber has a series of spaced air flow baffles extending across the flow of air through said secondary section.

17. The apparatus as recited in claim 1, wherein said means for producing heating in said first chamber includes:
- a plurality of elongated electric heating elements extending in generally parallel relation to one another and being operable for emitting heat radiation; and
- means for mounting said heating elements in said first chamber.

18. The apparatus as recited in claim 17, wherein said means for producing heating in said first chamber further includes means for partially encircling said electric heating elements adjacent to said casing wall for deflecting said heat radiation away from said wall and into said chamber.

19. The apparatus as recited claim 1, wherein said means for producing heating in said second chamber includes:
- a plurality of elongated electric heating elements extending in generally parallel relation to one another and being operable for emitting heat radiation; and
- means for mounting said electric heating elements across said second chamber in an orientation intermediate between vertical and horizontal orientations.

20. A method for controlled processing of materials, comprising the steps of:
(a) providing a casing having outer and inner spaced walls forming an airtight vessel inside of said inner walls defining a first chamber and a second chamber communicating with the first chamber, forming a channel between said outer and inner walls surrounding said vessel for containing a flow of a coolant fluid through said channel, and forming a discharge location through the outer and inner walls of the casing communicating the second chamber to the exterior of the casing;
(b) receiving in the first chamber feed materials to be processed;
(c) producing heating in the first chamber to cause pyrolyzing of the feed materials into fluid materials;
(d) receiving the fluid materials from the first chamber into the second chamber and thereafter communicating the fluid materials to the discharge location;
(e) producing heating in the second chamber to cause oxidizing of the fluid materials into discharge gases reaching the discharge location;
(f) producing separate variable primary and secondary flows of air through said walls of said casing and respectively into and through said first and second chambers and from said second chamber to said discharge location, said producing including the steps of
  (i) regulating the primary flow of air through said walls of said casing and into said first chamber,
  (ii) regulating the secondary flow of air through said walls of said casing and into said second chamber, and
  (iii) operating an induction fan to draw into said second chamber said primary flow of air through said walls of said casing and into and through said first chamber and therefrom through said second chamber to said discharge location and concurrently to draw into said second chamber said secondary flow of air through said walls of said casing and into and through said second chamber to said discharge location;
(g) sensing the temperatures in the first and second chambers;
(h) sensing the temperature of said coolant flow through said channel between said outer and inner walls of said casing;
(i) sensing the concentration of a predetermined gas in the discharge gases;
(j) proportioning the respective amounts of primary and secondary flows of air drawn through said walls of said casing and into and through said respective first and second chambers to said discharge location; and
(h) in response to the temperatures sensed in the first and second chambers and in said coolant flow through said channel between said outer and inner walls of said casing and to the concentration of the predetermined gas sensed in the discharge gases, controlling the speed of operation of the induction fan to vary the amount of air flow drawn through said walls of said casing and into said respective first and second chambers and controlling the proportioning of the respective amounts of the primary and secondary air flows drawn through said walls of said casing and into said respective first and second chambers to thereby control the heating in the first and second chambers in order to maintain effective pyrolyzing and oxidizing of the feed materials therein.

21. The method as recited in claim 20, wherein said predetermined gas in the discharge gases being sensed is oxygen.

22. The method as recited in claim 20, wherein said second chamber is provided as primary and secondary sections for oxidizing the material in two successive stages.

23. The method as recited in claim 20, further comprising the step of:
providing a heat exchanger connected in flow communication between said second chamber and said discharge location.

24. The method as recited in claim 20, wherein said producing heating in said first chamber includes emitting heat radiation from a plurality of elongated electric heating elements.

25. The method as recited in claim 24, wherein said producing heating in said first chamber further includes deflecting said heat radiation into said first chamber.

26. The method as recited in claim 20, wherein said producing heating in said second chamber includes emitting heat radiation from a plurality of elongated electric heating elements disposed across said second chamber in an orientation intermediate between vertical and horizontal orientations.

27. The method as recited in claim 20, wherein said controlling the air flow includes:
comparing the oxygen concentration sensed to preset target levels; and
changing the proportion of primary air flow to secondary air flow if the sensed oxygen concentration is either higher or lower than the preset target levels.

28. The method as recited in claim 27, wherein said changing of the proportion of primary and secondary air flows occurs at a higher rate if the sensed oxygen concentration is lower than the preset target levels than if the sensed oxygen concentration is higher than the preset target levels.

29. The method as recited in claim 20, wherein said controlling the air flow includes:
comparing the oxygen concentration sensed to preset target levels; and
changing the speed of an induction fan to change the amount of primary and secondary air flows if the sensed oxygen concentration is higher or lower than the preset target levels.

30. The method as recited in claim 29, wherein said changing of the speed of the induction fan occurs at a higher rate if the sensed oxygen concentration is lower than the preset target levels than if the sensed oxygen concentration is higher than the preset target levels.

31. The method as recited in claim 20, wherein said controlling the heating includes:
comparing the temperatures sensed to preset target levels; and
increasing the heating if the sensed temperatures are lower than the preset target levels.

* * * * *